Sept. 9, 1941.  M. EWALD  2,255,049
FRUIT TREATING DEVICE
Original Filed Oct. 6, 1932   7 Sheets-Sheet 1
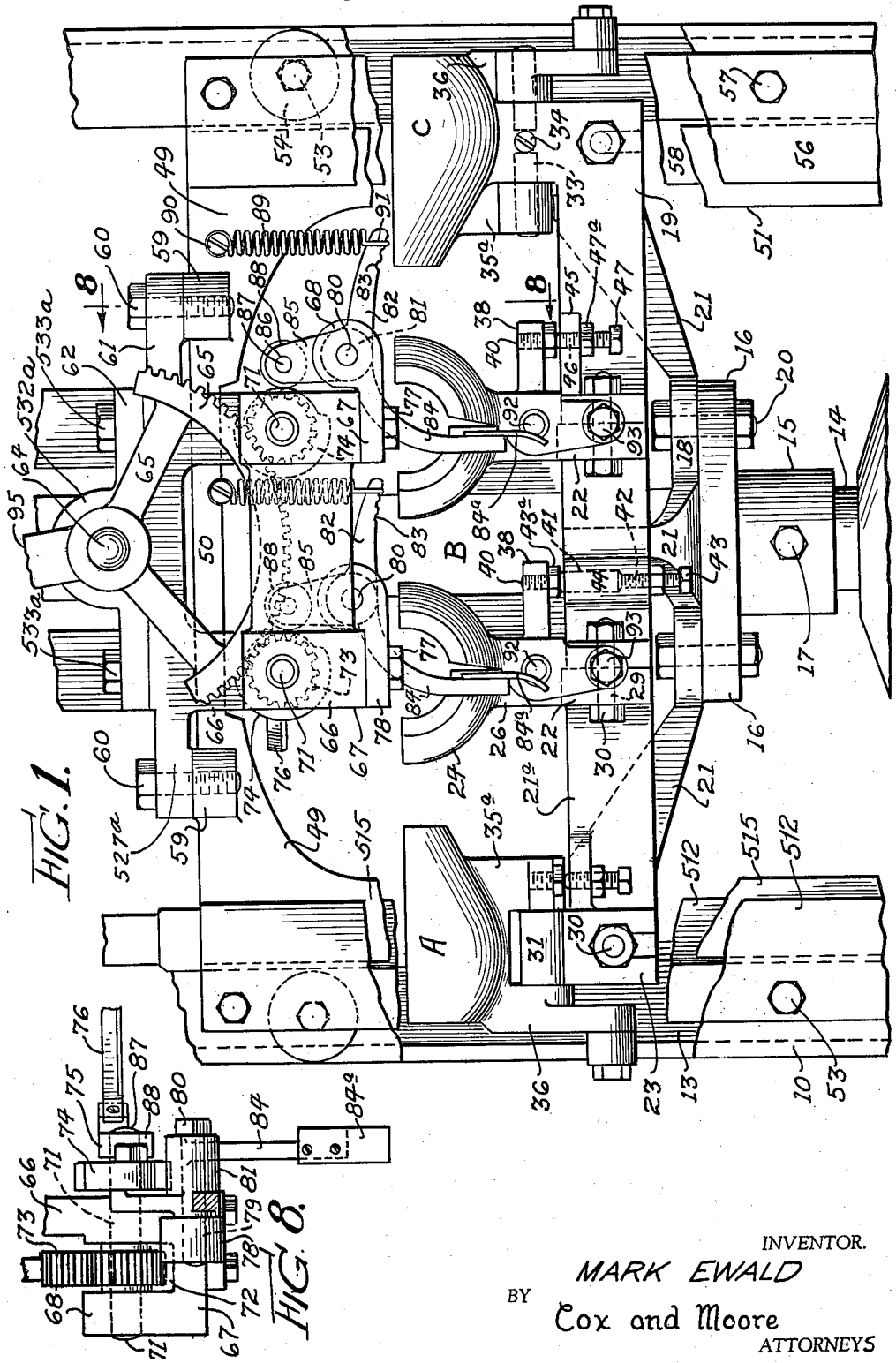
INVENTOR.
MARK EWALD
BY Cox and Moore
ATTORNEYS

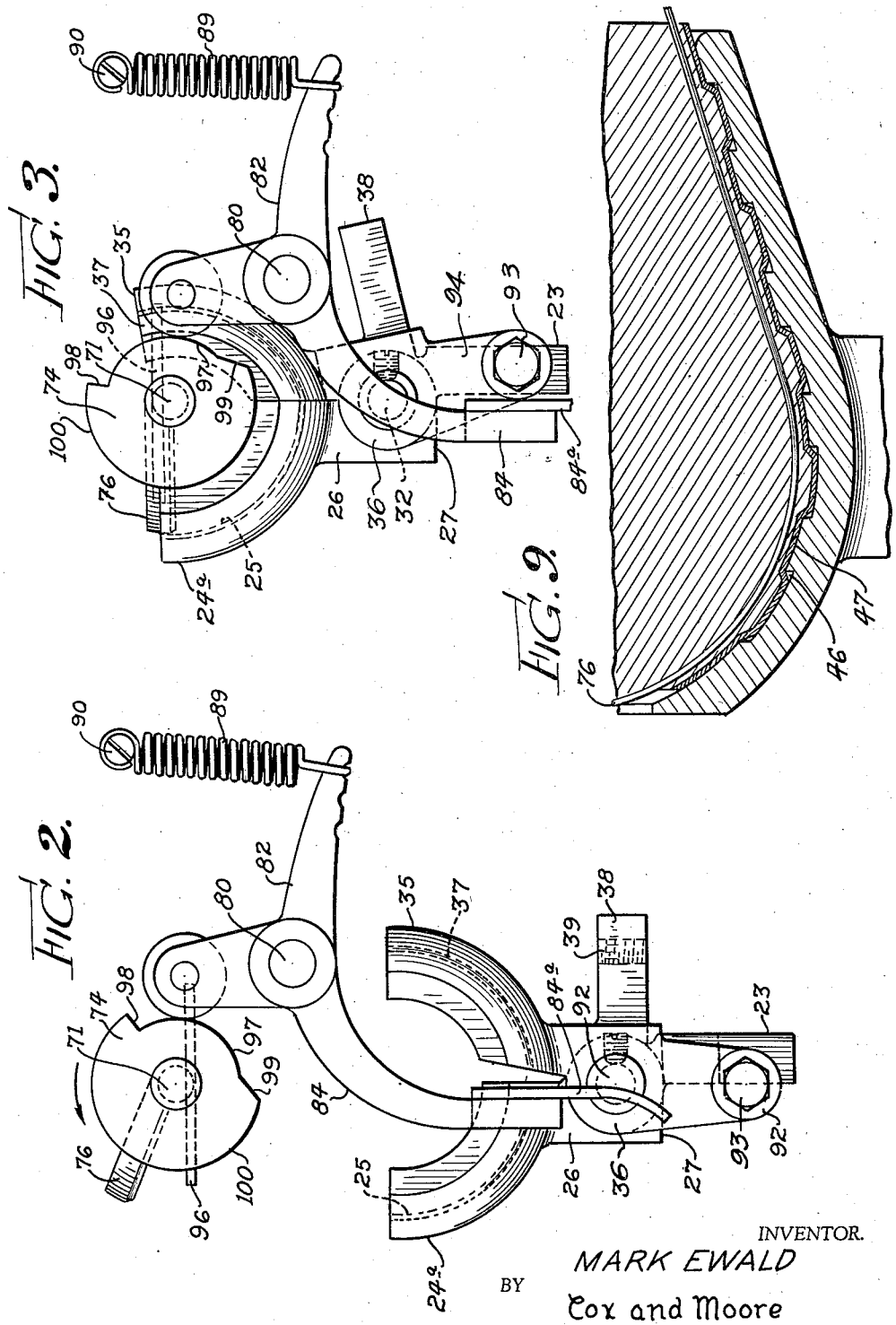

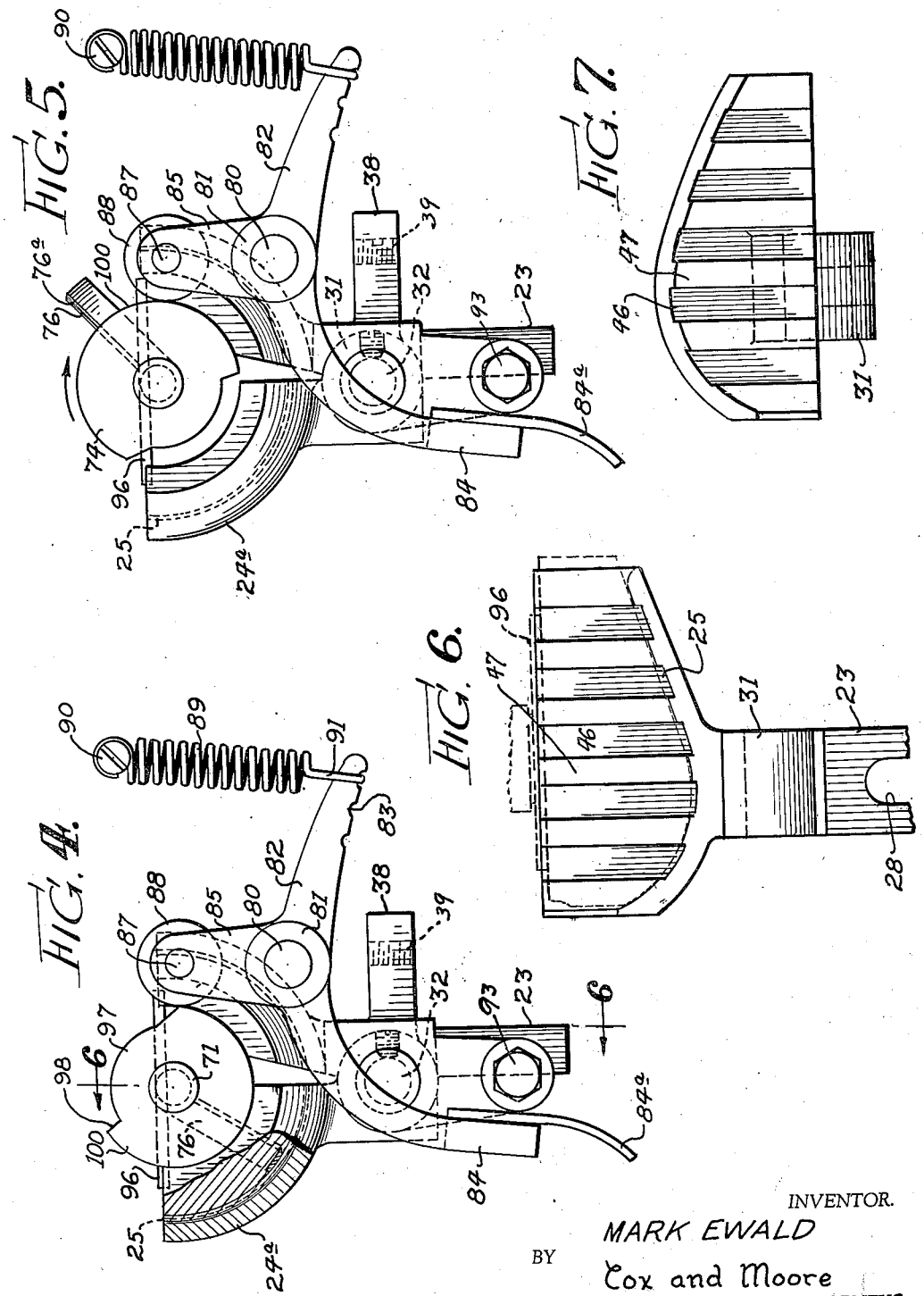

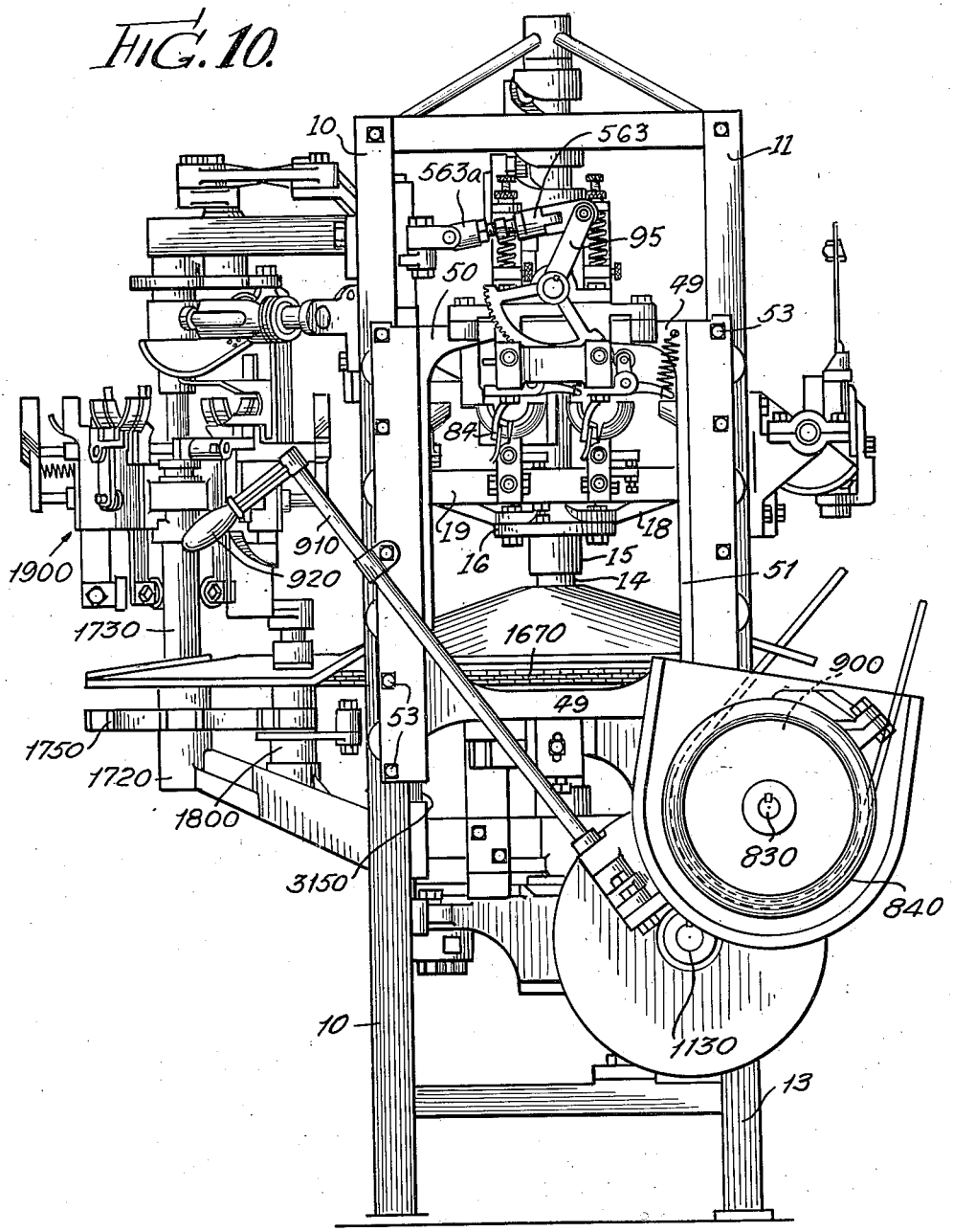

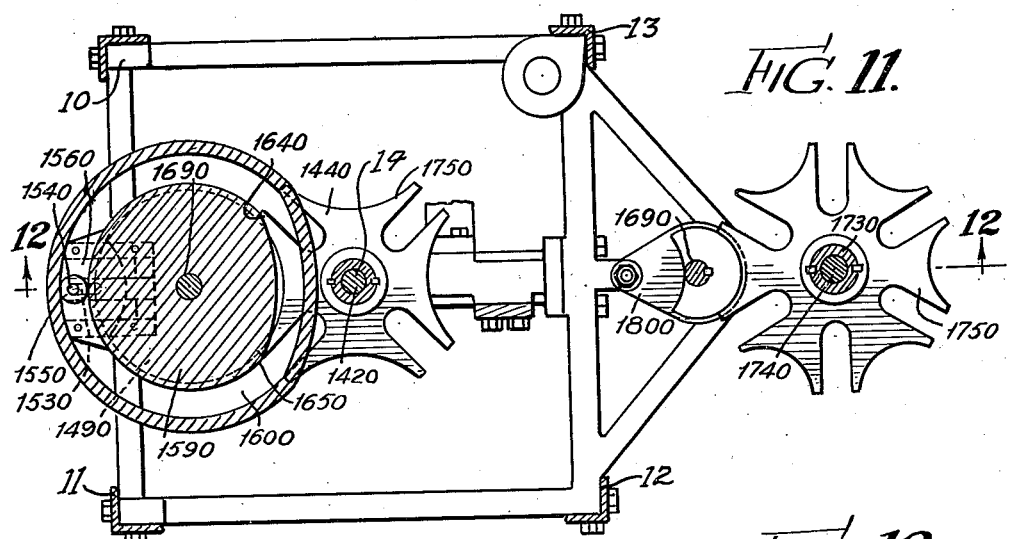
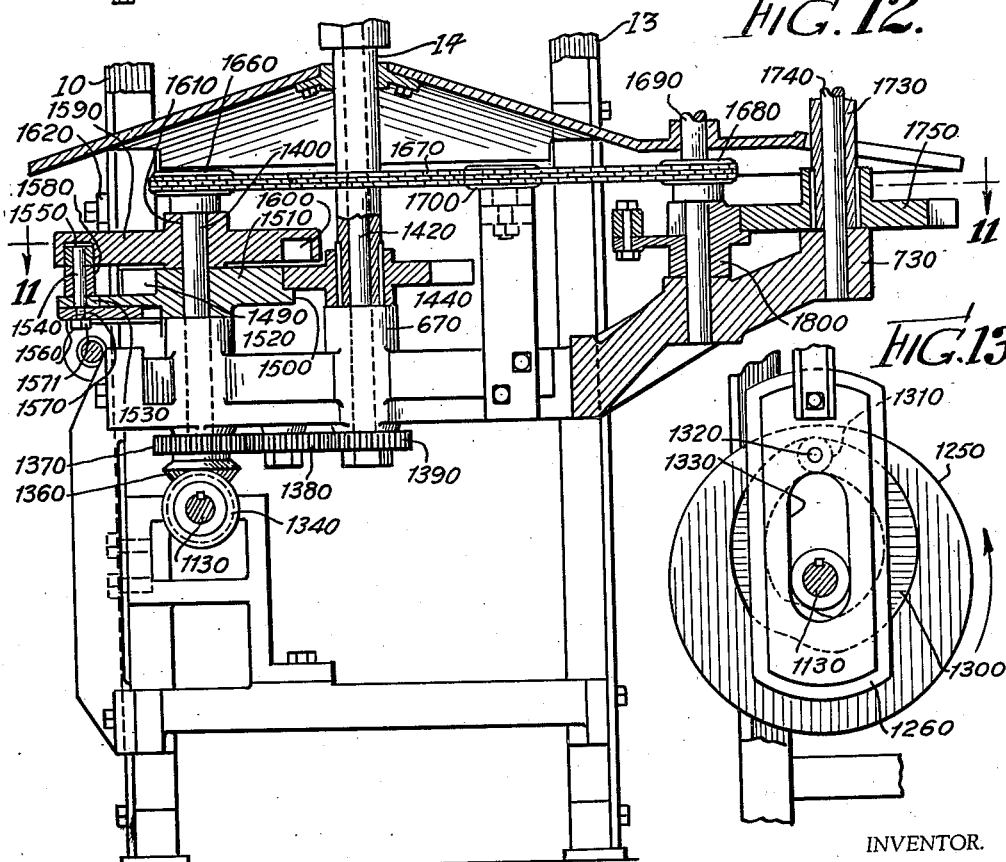
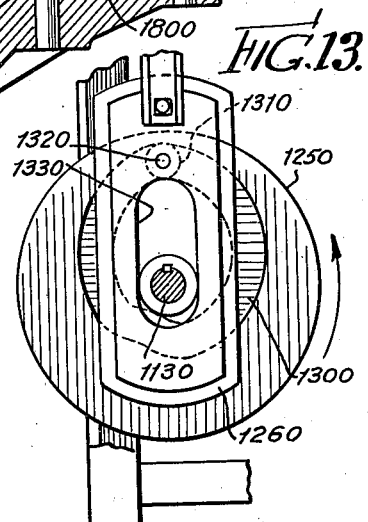

Sept. 9, 1941.  M. EWALD  2,255,049
FRUIT TREATING DEVICE
Original Filed Oct. 6, 1932  7 Sheets-Sheet 6
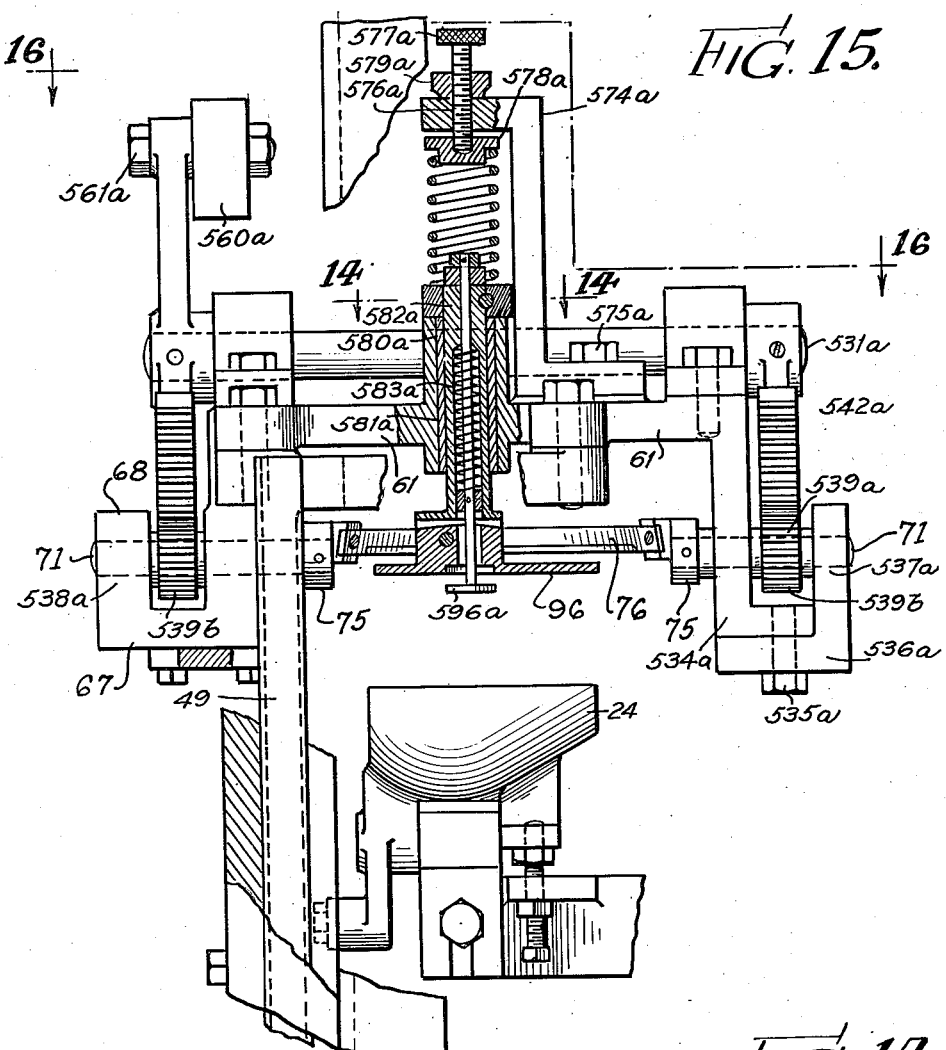
FIG. 15.
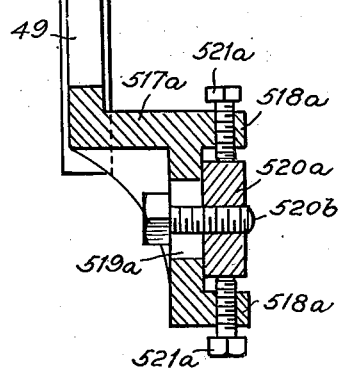
FIG. 14.
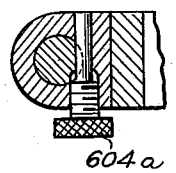
INVENTOR.
MARK EWALD
BY Cox and Moore
ATTORNEYS Sept. 9, 1941. M. EWALD 2,255,049
FRUIT TREATING DEVICE
Original Filed Oct. 6, 1932 7 Sheets-Sheet 7
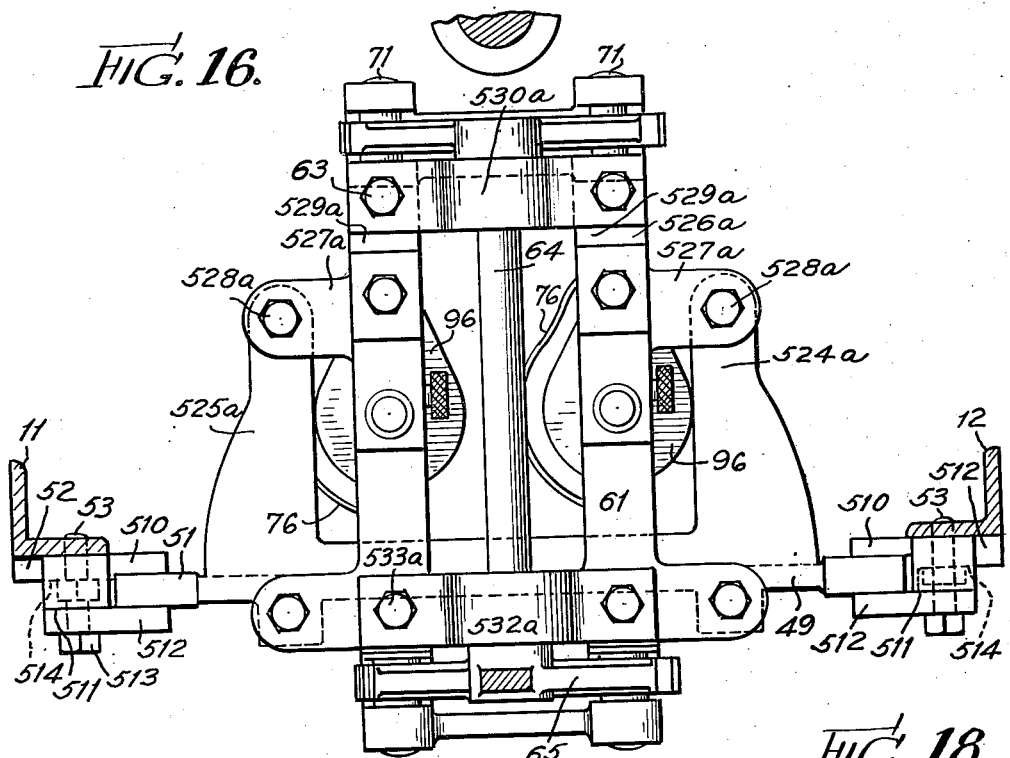
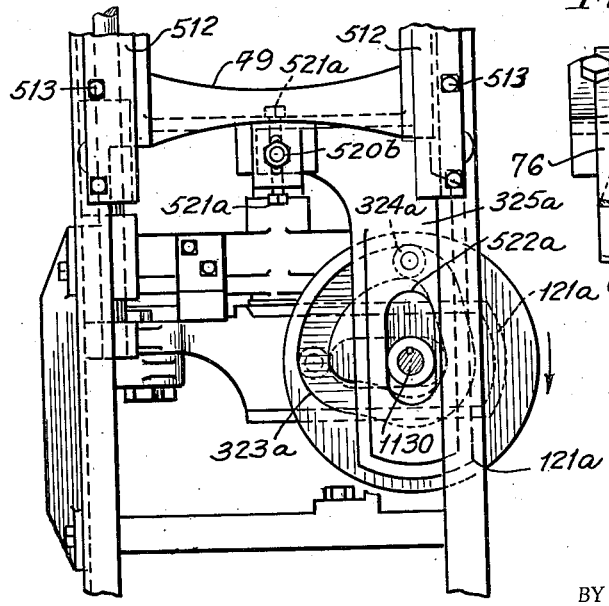
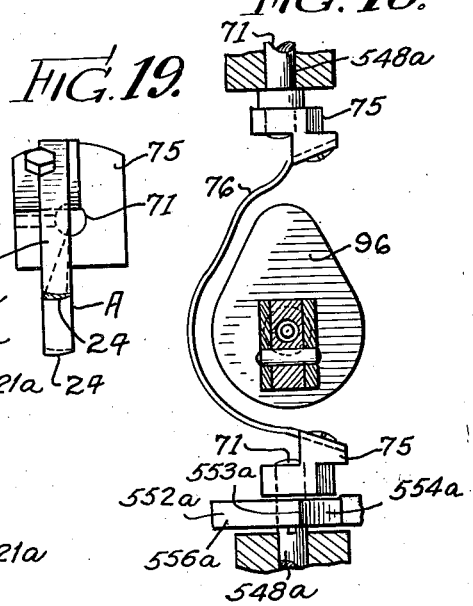
INVENTOR.
MARK EWALD
BY Cox and Moore
ATTORNEYS Patented Sept. 9, 1941

2,255,049

UNITED STATES PATENT OFFICE 2,255,049

FRUIT TREATING DEVICE

Mark Ewald, Olympia, Wash., assignor to Special Equipment Company, Portland, Oreg., a corporation of Oregon Original application October 6, 1932, Serial No. 636,447. Divided and this application April 11, 1938, Serial No. 201,413

56 Claims. (Cl. 146—43)

This invention relates to a fruit treating apparatus, and this application is a division of my co-pending application, Serial No. 636,447, filed October 6, 1932, for an improvement in Fruit treating apparatus.

Among the objects of the present invention are to provide a fruit treating apparatus adapted to hold a half fruit such as a half pear, half peach, and the like, so that a suitable cutting operation may be performed upon the half fruit while it is held; another object of my invention is to provide a fruit treating apparatus for treating half fruits and particularly for effective means for holding the half fruit during the peeling operation; to provide an improved means for holding a half fruit in a substantially cup-like fruit holder during the peeling operation and wherein means is provided for insuring a predetermined space between the path of travel of the peeling blade and the inner wall surface of the fruit holding cup; to provide a fruit holding cup adapted to close about a half fruit including means for tightly closing said cup about the fruit incident to the starting of the peeling blade beneath the fruit skin; to provide mechanism for yieldingly compressing the walls of the fruit cup about a half fruit and including means disposed for releasing such compressing action after a peeling blade has progressed a selected distance pursuant to slicing a portion of the peel from the fruit; to provide a mechanism for performing a cutting operation upon a half fruit while the fruit is held in a fruit holder, preferably a cup-shaped fruit holder, wherein the fruit holder is formed of sections adapted to grip the surfaces of the fruit during at least a portion of the cutting operation and wherein auxiliary fruit holding means is brought into contact with a portion or portions of the cut face of the fruit during the cutting operation and particularly when the cutting operation is a peeling operation and wherein means is provided for altering the gripping effect on the fruit during predetermined portions of the cutting action to facilitate the proper cutting of the fruit; to provide an improved inner wall structure for the fruit holding cup or fruit holder whereby when the cutting action is taking place on the fruit rigidly held within the walls of the fruit holding cup, means is provided for relieving the fruit displaced by the area of the cutting knife as it passes through the fruit; to provide a fruit holding device such as a fruit holding cup provided with means into which the peel is laterally forced during the peeling operation whereby the fruit displaced by the peeling knife is relieved; to provide a fruit cup or fruit container with suitably formed grooves, recesses or the like into which the peel is wedgingly forced during the peeling operation whereby to facilitate the passage of the peeling knife through the fruit but also to cause the peel to wedge in the cup whereby to assist in retaining the peel in the cup so that the peeled fruit may be discharged from the cup, leaving the peel in the cup; to provide an improved mechanism for performing a cutting operation upon a half fruit in a multipart fruit cup or container wherein such a container or cup carrying the fruit therein is moved into cutting position opposite a cutting station and wherein cutting mechanism is brought into position into contact with the fruit while the latter is held in the multi-part cup and wherein means is provided for automatically passing the fruit cutter through the fruit while the latter is so held and wherein means is provided for causing the half fruit to shift laterally in and relatively to the cup as a whole in order to insure the accurate peeling of the fruit; to provide an improved type of fruit cup comprising a plurality of sections relatively movable and between which sections the half fruit is held during a peeling operation and wherein means is provided for first forcing the half fruit firmly against one wall portion of the fruit container during a portion of the peeling action and wherein the fruit is then free to move laterally in the cup and is forced against another wall portion of the cup during and by a subsequent portion of the travel of the peeling knife and in a manner to insure an accurate peeling of a further portion of the half fruit; to provide a two-part fruit cup wherein the two sections thereof are mounted for relative movement and which fruit cup is adapted to receive a half fruit therein whereby to hold the fruit during a peeling operation and wherein the peeling knife sweeps throughout the fruit cup and wherein means is provided for forcing the half fruit snugly against the inner wall of one section of the fruit cup upon a downward movement of the peeling blade therethrough and wherein means is provided for permitting the half fruit to shift relatively to the fruit cup into snug engagement with the inner wall of the opposite section upon further movement of the peeling knife in the fruit cup whereby constantly to maintain an accurate path of travel of the peeling knife with respect to the peel of the fruit while in the cup; to provide a peeling mechanism of the foregoing construction wherein a pad or fruit contacting means is utilized for contacting the cut face of the fruit whereby to prevent the fruit from turning angularly within the cup during the peeling or cutting operation; to provide a peeling mechanism wherein a pad is utilized to contact the cut face of the fruit to hold the fruit from pivotal movement while at the same time permitting the fruit to slide laterally under the influence of the peeling knife; to provide a plurality of adjustments for relatively positioning the knife and the cup mechanism during the peeling operation; to provide a plurality of adjustments of the peeling head relative to the cup mechanism and/or to provide a plurality of adjustments of the cup mechanism to accommodate variant sizes of fruit; to provide these and other objects of invention as will be apparent from the following specification when taken in connection with the accompanying drawings, wherein:

Fig. 1 is a fragmentary elevation of a fruit treating machine embodying fruit containers or holders of the present invention;

Fig. 2 is an end view of a fruit holder shown in open position and with a paring blade removed therefrom;

Fig. 3 is a similar view to Fig. 2 with paring instrumentalities in cooperative position to the fruit holder;

Fig. 4 is an end view of a fruit holder or cup after a paring blade has progressed partly about the inner wall thereof;

Fig. 5 is an end view of a fruit cup or holder and associated mechanism subsequent to the passing of the paring blade from and within the cup;

Fig. 6 is an inner side view of a fruit holding cup taken along the line 6—6 of Fig. 4;

Fig. 7 is a plan view of a cup element shown in Fig. 6;

Fig. 8 is a partial sectional view of the device taken on line 8—8 of Fig. 1;

Fig. 9 is an enlarged sectional view showing the manner in which the peel is displaced into the relieving means formed on the inner walls of the fruit holder, the construction showing a specific embodiment of the generic invention for accomplishing this purpose;

Fig. 10 is a side elevation of one type of machine embodying my invention taken from the right side thereof;

Fig. 11 is a horizontal plan section of the machine showing the Geneva driving mechanism for the turret;

Fig. 12 is a side view of the Geneva driving mechanism;

Fig. 13 is a side view of the cam and cam follower utilized in operating certain of the instrumentalities of the machines hereinafter more fully described;

Fig. 14 is a sectional view of a certain part of the peeling mechanism taken on line 14—14 of Fig. 15;

Fig. 15 is a sectional view of the device illustrating the peeling mechanism and peeling pad and knock-out pad;

Fig. 16 is a horizontal plan section of the peeling mechanism taken from above at the line 16—16 of Fig. 15;

Fig. 17 is a sectional view of the device illustrating a cam mechanism for operating certain of the parts;

Fig. 18 is a sectional view of the peeling mechanism illustrating the contour taken by the peeling blade when the latter is arranged for peeling pears, it being understood that any desired type of peeling blade may be utilized for peeling different types of fruit; and Fig. 19 is a fragmentary view of the peeling knife.

The various features of my invention are capable of embodiment in any desired type of machine or apparatus for treating fruit whether the fruit be half peaches, half pears, or any other variety. However, I have illustrated for purposes of convenience, my invention as applied to a machine of the general character shown in my Patent No. 2,161,807, it being understood, however, that the invention is not so restricted.

In order to facilitate the description of my invention, therefore, I shall describe it as applied to machines of such type, it being understood that the present invention is concerned with only certain of the operations of a complete machine. This complete machine is illustrated and described in my prior application serially numbered 636,447, filed October 6, 1932, and entitled Fruit treating apparatus, of which the present application is a division and wherein the claims are drawn to the various operations performed by that machine upon the fruit including stem bobbing, fruit splitting, fruit peeling and coring operations all performed in synchronism.

The claims of the present application are confined to the features of construction of the fruit holder, particularly the sectional fruit holder having relatively movable sections, in combination and cooperation with the operation of a cutting blade, and/or also in combination and cooperation with the constructional features of the auxiliary fruit holding mechanism or pad for contacting the cut face of the fruit, and also the constructional features of the inner surfaces of the fruit holder, whereby to facilitate the peeling operation, specifically the grooved nature of the inner walls of the fruit holder.

Inasmuch as the claims of the present invention are limited to the aspects of the invention above enumerated, I shall not describe the entire machine but shall describe only such parts thereof as contribute to the inventive features claimed in this present application. While in the present application I have disclosed the invention as applied for the treatment of pears, the invention is adaptable, with certain changes, likewise for the treatment of peaches and other fruit, and therefore except in so far as specific claims are concerned, particularly restricting the claim to the treatment of a pear, it is to be understood that the disclosure of the machine in connection with the treatment of pears is purely illustrative.

The fruit treating machine, of which the present invention is a part, is supported upon a frame comprising four upright members 10, 11, 12 and 13. The upright members are disposed at the four corners of a rectangle and are suitably held in a rigid formation by cross members (not shown). Rising vertically within the frame comprising the four vertical uprights is a shaft 14. Suitable bearings retain the shaft 14 in its vertical position in such a manner that it may rotate therein. There is a Geneva cam arrangement for imparting intermittent rotative motion to the vertical shaft 14. This cam arrangement is shown in Figs. 11 and 13 of the drawings. As viewed from above, the shaft 14 is given such motion as to cause it to rotate in an anti-clockwise direction.

In Fig. 10 I have shown a drive shaft 830, which has upon the extended end thereof a hand wheel 840. Behind the hand wheel is keyed to the shaft 830 a slidable flanged collar, not shown. As disclosed in my prior application Serial No. 636,447, and not shown specifically herein, clutch means is provided including a friction disk engageable with a driving pulley for driving the shaft 830. This clutch mechanism is operated by the shaft 910, which is provided with a handle 920 on the upper end thereof.

Supported in the main frame of the machine between the uprights 10, 11, 12 and 13 is a suitable bracket, see Fig. 12, for supporting the opposite ends of the main cam shaft 1130. Suitable gearing interconnects the shaft 1130 with the main drive shaft 830 and a face cam plate 1250, see Fig. 13, keyed to the main shaft 1130 drives two cam follower plates 1210 and 1220, shown in Figure 17, hereinafter to be described. The face cam plate 1250 is keyed to the shaft 1130 and there is provided a cam follower 1260 for cooperating with the cam plate 1250. Within the right face of the face cam plate 1250 is an irregular, eccentric groove 1300, Fig. 13. A roller bearing 1310 operates within the groove 1300 and is secured to the cam follower plate 1260 by means of a pin 1320. Within the cam follower plate 1260 is a vertical slot 1330 for the reception of the shaft 1130 to adapt the plate for reciprocation as it is propelled by the roller 1310 within the groove 1300. A bevel gear 1340, Fig. 12, is secured to the cam shaft 1130. Bevel gear 1340 meshes with a second bevel gear 1360. Gear 1370 located above the pinion 1360 meshes with an idler gear 1380 for driving a third gear 1390. A shaft 1400 carries the gears 1360 and 1370 at its lower end, while shaft 1420 carries the gear 1390. Resting on top of the bearing 670 is a sleeve 14 which is free to turn independently of the shaft 1420 and has keyed thereto for common rotation a star cam 1440, see Fig. 11. This cam forms a part of an ordinary type of Geneva movement which cooperates with a Geneva cam plate 1490 in the well known manner. The cam plate 1490 is circular and is disposed within a horizontal plane common to that of the body of the star cam 1440. A narrow flange 1500 circumscribes the lower edge of the main body 1510 of the cam to extend therefrom as a section thereof 1520. Within the section 1520 is a slot 1530 with its major dimensions arranged radially of the vertical axis within the shaft 1400. The slot 1530 slidably carries a pin 1540, which, in turn, carries a roller bearing 1550 upon its upper end. A plate 1560 is free to slide along the lower face of the cam section 1520 and has an aperture 1570 for receiving the lower end of the stem 1540, which is threaded for the reception of a bolt 1571 for holding the plate 1560 in place. Above the cam section 1520 is a sleeve 1580 for measurably spacing therebetween the roller bearing 1550.

Above the Geneva cam plate 1490 is a stationary cam plate 1590 which presents a groove 1600 in its lower face and which groove is substantially the same width as is the roller 1550 and which is for propelling the roller 1550 axially of the Geneva cam 1490 as the latter is rotated with the shaft 1400. A bearing 1610 within the cam plate 1590 provides for free rotative movement of the shaft 1400 therein, while a bar 1620 held between the frame members prevents rotation of the plate 1590. The contour taken by the groove 1600 for the greatest portion thereof is of a radius generated about the axis 1400. Between the points 1640 and 1650, however, see Fig. 11, the groove 1600 is generated about a point more distant therefrom than the shaft 1400. Upon the upper end of the shaft 1400 is a sprocket wheel 1660, Fig. 12, for driving a chain 1670. The opposite and forward end of the chain 1670 drives a sprocket 1680 which is upon a vertical shaft 1690. Intermediate the two sprockets 1660 and 1680 is an idler sprocket 1700 to prevent flapping of the chain due to vibration. In Fig. 12 is shown a Geneva cam arrangement for driving the sleeve 1730 intermittently about a rod 1740, which is held stationary within the bearing 1720 of the frame. Keyed to the sleeve 1730 is a star cam 1750, which forms one part of a Geneva movement, see Figs. 11 and 12. Keyed to the shaft 1690 is a counterpart Geneva cam plate 1800.

The feed turret

By reference to Fig. 10, it will be noted that the top of the sleeve 1730 is provided with a feed turret 1900. The construction and operation of this feed turret is shown and claimed in my Patent No. 2,161,806, issued June 13, 1939, on application Serial No. 621,857, filed July 11, 1932, certain subject matter of which is likewise disclosed and claimed in my pending application Serial No. 621,914, filed July 11, 1932.

Power for driving the feed turret 1900 is received from the pulley 900 and the main drive shaft 830, which may be driven from any convenient source of power to rotate in a clockwise direction as viewed from the right side of the machine. When it is desired to connect the shaft 830 to the pulley 900 the operating shaft 910 is given a turn in a clockwise direction with reference to its handle bearing to operate the clutch, not shown, with the pulley 900 so that when the drive shaft 830 is set in motion through suitable gearing, not shown, the pinion 1360 and the gear 1370, as viewed from above, are rotated in a clockwise direction through the agency of the bevel gear 1340. The shaft 1400 and the sprocket wheel 1660 are also rotated in a clockwise direction whereby the sprocket wheel 1680 and the shaft 1690 are caused to rotate in a like direction.

The Geneva cam movement of the turret is designed so that each movement given to the turret will be one-sixth of a revolution to move the feed cups from one station to the next, where a feed cup will be permitted to remain until the following movement is imparted to the feed turret.

Secured to the shaft 14 to rotate in an anti-clockwise direction therewith is a flanged collar 15 with a flange 16 disposed in a horizontal plane. Longitudinal displacement of the collar 15 along the shaft 14 is precluded by a set screw 17. Resting upon the flange 16 is the base 18 of a turret 19. Base 18 and flange 16 are apertured for the reception of bolts 20 whereby the two members are held rigidly together. These bolts 20 are utilized for adjustably positioning the knife, hereinafter referred to, with respect to the side of the stationary half of the fruit holder where the knife enters the fruit, as will be hereinafter set forth. This adjustment is made by loosening these bolts 20, then swinging the table or turret until the desired distance is obtained, and then reclamping the bolts.

Radiating from the base 18 are four spokes 21 separated by equal angles, three of which spokes are shown in Fig. 1. Integral with the ends of the spokes 21 is the rim 21a of the turret 19. On either side of the extended ends of the spokes 21 and projecting from the rim 21a of the turret are lugs 22, preferably of rectangular cross section, see Fig. 1.

With reference to Fig. 1, upon the right face of the lugs 22 are mounted the stems 26 of the fruit holding means, specifically fruit cups 24. Since there are two fruit cups disposed adjacent the ends of each of the spokes 21, there are eight cups arranged about the periphery of the turret. A halved fruit is placed within each fruit cup 24 after a whole fruit has been halved centrally along its axis. Each half fruit has the peel bearing portion placed adjacent the cup walls, the cut face of the half fruit lying uppermost. After a pair of fruit cups is loaded with halved fruit, the turret is then intermittently rotated to deliver the pair of cups successively to four different stations, the stations being located between each pair of the frame upright members. Station A is located between the upright members 10 and 13, station B between the upright members 10 and 11, station C between the members 12 and 12, and station D between the members 12 and 13. Manifestly the present invention is not restricted to the exact number of stations or the sequence thereof.

Fruit which has previously been split in the manner above described is placed in the fruit cups 24 at station A. Subsequent to the placing of the fruit therein at station A, a movement is imparted to the shaft 14 and hence the turret 19 to carry the cups from station A to station B. At station B a peeling mechanism to be described later in this specification cooperates with the fruit cups 24 to remove the peel from the halved fruit. After the peel has been removed from the fruit, the next intermittent motion of the turret 19 advances the cups to station C where other instrumentalities (not shown) remove the core or pit from the fruit. Concurrent with the coring or pitting operation at station C, the fruit is carried from the cups and delivered to a suitable conveyor or moving belt alongside of the machine. The cups from which the fruit has been abducted are, by the succeeding movement of the turret 19, carried to the station D where other mechanism not claimed herein removes the fruit peel from the cup. Thereafter, the cups are removed to station A preparatory to having other fruit placed therein and the cycle re-enacted.

Fruit holder

The fruit holders forming a portion of the present invention are constructed and arranged to hold the half fruit while the cutting operation is performed thereon. These fruit holders are preferably in the form of fruit cups and are formed of a plurality of relatively movable parts having opposed inner wall portions adapted to grip the curved surfaces of the fruit during at least a portion of the operation of the cutting knife upon the fruit and in addition the construction of the fruit holders enables them to cooperate with auxiliary fruit holding means, hereinafter termed a pad, which functions to contact one or more portions of the cut face of the fruit during the cutting operation to assist in holding the fruit from turning about its axis in the fruit holder.

In addition the fruit holder is constructed of relatively shiftable sections to cooperate with a cutting instrumentality which is adapted to pass through the body of the fruit while it is so held. Specifically the cutting instrumentality in the present instance comprises a peeling or paring knife adapted to sever the peel from the half fruit while it is so held within the holder. The details of construction of the specific type of fruit holder are well illustrated in Figs. 2 to 6 and 9. As there shown, the fruit holder is composed of two substantially identical sections, one a stationary element 24a which embodies a cup wall 25 with a stem 26 depending downwardly therefrom, cut-away section 27 half-way down the stem providing a seat for resting upon the boss 22 of the turret 19; the extreme lower part 23 of the stem 26 carries a notch 28, see Fig. 6, for registering with an aperture 29 within the boss 22. A bolt 30 co-contained by notch 28 and aperture 29 serves for securing the stem 25 to the boss. It is the purpose of the notch 28 to facilitate the removal and replacement of different sized fruit cups from and on the turret. Irrespective of the size of the fruit cups, the distance from the seat at 27 to the center line of the cup, which is also the center line of the axis about which the peeling knife swings remains the same so that when a cup is placed upon a boss 22 the peeling knife 76 will reach to a selected distance from the bottom of the cup. Adjustment of the path of swing of the blades 76 relative to the walls of the fruit cups is had by moving the support for the blades. Irrespective of the size of the fruit cups, the distance from the seat 27 to the center line or longitudinal axis of the cup and the coincident axis of rotation of the knife 76 remains the same. In other words, the plane of the cut face of the fruit to be peeled lies the same distance from the seat regardless of size, with the exception of small variation due to different diameters of the fruit within the size limits of the cup being used.

These center lines must coincide, otherwise the peeling knife could not pass the inner wall of the cup at a uniform distance from the wall during the peeling cut. To explain this further, suppose that a cup is used having a radius of one and one-fourth inches (1¼″) at its widest diameter and a peeling knife that swings with a radius three thirty-seconds of an inch (3/32″) less than the radius of the cup, as shown in Fig. 4. The center lines must coincide to gain the results as stated. Now, if a cup was placed in the machine with a radius of one and three-eighths inches (1⅜″) with the corresponding knife the center lines would remain the same distance from the seat 27, but the bottom inner wall of the cup would be one-eighth of an inch (⅛″) closer to the seat 27. In other words, the larger the cup the closer the bottom will be to seat 27, and vice versa; but the distance to the center line is constant. Since in operation in a cannery machines must be changed frequency from one size to another, this arrangement makes for a set-up that keeps concentricity between the cup and the knife, no matter what the size, and also keeps the predetermined distance between the knife and the cup with no further adjustment when a change is made from one size to another.

In the right side of the stem 26 is an enlarged portion 31 which is drilled for the insertion of a stub shaft 32 or hinge pin thereinto. The center portion of the shaft 32 contains a deep groove 33, see Fig. 1, into which a set screw 34 may be inserted for maintaining the selected position of the shaft within the projection 31. The movable element 35 of the cup, and which includes the cup wall 37, has depending therefrom two journal members 35a and 36 at the back and front side respectively, see Fig. 1.

The members 35a and 36 are disposed at opposite sides of the enlarged portion 31 of the stem 26 and the journals therein receive opposite ends of the stub shaft 32. The cup walls 37 of the element 35 are then capable of being moved toward and away from the cup walls 25 by pivoting about the journals containing the ends of the stub shaft 32. Projecting to the right from the journal 35a is a short arm 38 containing a threaded aperture 39. Within the aperture is an adjustment bolt 40.

The movable section of the cup is arranged so that when released from its closed position, as hereinafter set forth, it will automatically fall to an open position due to its loose fit upon the hinge pin or stub shaft 32, the weight of the cup being away from the center of the pin on that side.

Directly to the left of the center spoke 21, Fig. 1, and in the rim 21a of the turret, is a recess 41 countersunk at 42 to communicate between the top and lower surface of the rim. The countersunk portion 42 is threaded to receive a bolt 43. Resting upon the bolt 43 is an adjusting pin 44 which projects above the top of the rim 21 and registers with the head of the adjustment bolt 40. By screwing the bolt 43 upwardly into the recess 41, the cup wall 37 will be pivoted about the shaft 32 to be brought closer to the wall 25. In this manner the cup 24 may be adjusted for adjusting the thickness of the peeling taken from the fruit. After the adjustment for the cup size has been made, the lock nut 43a is tightened against the rim 21a to maintain the adjustment.

For coacting with the adjustment screw 40 upon the cup 24 immediately to the right of the central spoke 21 in Fig. 1 is shown a modification of the cup adjustment. There is an ear 45 projecting from the rim 21a which contains a threaded aperture 46 and a bolt 47 to thread therein. Adjustment of the cup 24 as to size is usually had by manipulating the bolt 47.

Once the bolt 47 is set as desired, a lock nut 47a is tightened against the rim for holding the assembly fixed.

In connection with the fruit holder, means is provided, specifically in the form of grooves, recesses, spaces, or the like to provide relieving means or spaces into which the peeled portion of the fruit may be displaced outwardly of the peeling knife, that is to the outside of the path of movement of the knife, which materially assists in the peeling operation by preventing the chattering of the knife by eliminating the accumulation of excess peel or fruit body ahead of the knife in its path of travel and by preventing any tendency of the severed layer to move with the knife and by eliminating any tendency of the peeled sections of fruit to resist movement of the knife.

To this end the interior of the cup wall segments 25 and 37 have cast or otherwise formed therein grooves 46 and ribs 47 alternately arranged. The grooves 46 and ribs 47, if desired, may be machined into the structure of the cup walls instead of being cast. In the present illustrated embodiment, which is preferably shown for handling pears, the interior of the cup wall segments 25 and 37 conforms to the shape of the general outline of a pear. The combined area of the grooves is preferably substantially equal to the fruit displaced by the peeling knife passing through the fruit.

A further description of the manner in which these grooves on recesses cooperate with the peeling knife will be hereinafter given.

Peeling mechanism

The peeling mechanism which cooperates with the cups 24 as they arrive at the peeling station is mounted upon a yoke 49, Fig. 1, which is adapted for reciprocation within a vertical plane just to the front of the frame upright members 10 and 11. A top bar 50 and side bars 51, along with a bottom bar, comprise the yoke 49. Bolted to each of the members 10 and 11 are angle bars 52 which are held in place by bolts 53 distributed at convenient points along their length. There are countersunk sections 54 within a flange 55 of the bars 52 for receiving the heads of the bolts 53 so that a plate 56 may lie flatly upon the front surface of the flange.

For holding the plate 56 to the flange 58 are bolts 57. The plate 56 is broader than the thickness of the flange 55 so that the plate may project beyond the edge of the flange 55 and in opposed relationship to the flange 58 of the angle member 52. Thus a track is formed at opposite sides of the machine for the members 51 of the yoke 49 to slide within. A cam arrangement, shown in Fig. 17, is operatively connected with the bottom of the yoke 49 for raising and lowering it in timed sequence with the intermittent motion of the cup turret 19.

Ears 59 project forwardly from the cross member 50 of the yoke 49 and are apertured and threaded for the reception of bolts 60 for the engagement of a base 61. Resting upon the base 61 is a bearing block 62 which is held in position by bolts 63. The bearing block 62 carries a shaft 64 upon which a segmental gear 65 is positioned so that the latter may rotate about the axis defined within the bearing of the bearing block.

Depending downwardly from the base 61 at opposite sides of the shaft 64 are brackets 66, see Fig. 1. The bottom portion of the brackets 66 are carried forwardly at 67 and again upwardly, to configure a journal section 68. Alined within the brackets 66 and the journal section 68 are bearings 69 and 70 for carrying shafts 71. Intermediate the journal blocks 68 and the brackets 66 are recesses 72 for the accommodation of gears 73 which are keyed to the shafts 71. The shafts 71 are of equal radii from the shaft 64 so that the segmental gear 65 may commonly engage the gears 73.

There are placed upon the shafts 71 adjacent to the inner faces of the brackets 66 circular cams 74. To the extreme inner end of the shafts 71 are attached blocks 75 in a non-rotative manner and to which in turn are attached the ends of the blades 76 of the fruit cutting means, herein specifically disclosed as a fruit peeling means.

The peeling knife is preferably constructed in accordance with the disclosure of my Patent No. 2,060,802, issued November 17, 1936. Where the peeling blade is constructed for peeling pears, it is given a longitudinal configuration similar to that shown in Fig. 19. In addition to the longitudinal curvature given to the blade, the inner face of the blade is given a surface which at all points focuses truly upon the axis A of rotation, wherein the inner surface of each section of the blade corresponds to a segment of a true circle with varying radii perpendicular to the axis of rotation A, and the centers of these radii coincide with and fall upon the center line of the axis of rotation. In addition the face of the outer section of the blade is rounded adjacent the leading edge thereof so that the outer face converges upon the inner face and forms a cutting edge that is relatively blunt. The cutting edge is substantially flush with the inner face. The bluntness of the angle between the inner face and the outer section of the blade may be varied within a limited range. For instance, hard pears should be peeled with a knife in which the angle at the cutting edge is relatively thinner, while soft fruit requires the blunter knife. However, since variation in the angularity is impossible due to variation of hardness in a run of fruit, even in the same box of fruit, it is essential that a happy medium of bluntness be arranged to take care of both hard and soft fruit. Where the fruit is hard, the angle made by the blunt outside grind tends to shear the knife into the fruit, thereby taking more flesh from the fruit than necessary, and where the cutting edge is not blunt enough, soft fruit will not be carried over to the hinged half of the cup. This blunt angle thus formed on the peeling knife has definite cooperation with the half fruit to be peeled and with the shiftable section of the fruit cup, as will be more fully described.

Peeling mechanism

The peeling mechanism, which cooperates with the cups 24 as they arrive at the peeling station, is mounted upon the yoke 49, Fig. 1, which is adapted for reciprocation within a vertical plane just to the front of the frame upright members 10 and 11. To the outer sides of the two upright members 10 and 11, which are disposed in a common plane, are bolted angle pieces 510, see Fig. 16. Attached to flanges 511 of the angle pieces 510, and which project outwardly from the side of the machine, are flat side strips 512 adapted to be held in place by bolt 513. Countersunk sections 514 within the flanges 511 provide a space for the heads of bolts which hold the angle pieces 510 in assembly with the upright pieces 11 and 12. A track is formed on the two upright members 11 and 12 by the angle pieces 510 and the guide strips or plates 512. Within said track there is disposed a slide or yoke 49 for vertical reciprocation. Depending from the bottom of this yoke 49, see Fig. 15, is a bracket 517a integral therewith and presenting opposed, apertured lugs 518a and a slot 519a. Intermediate the two lugs 518a there projects an arm 520a of a cam follower plate 325a, see Fig. 17. A bolt 520b within the slot 519a holds the arm 520a in assembly with the bracket 517a. Adjustment of the height of the yoke 49 relative to the arm 520a may be accomplished by manipulating the set screws 521a.

Within the cam follower 325a is a vertically arranged slot 522a for the reception of a main cam shaft 1130 and to provide for vertical movement of the cam follower. A roller bearing 324a coacts with a cam slot 323a for raising and lowering the cam follower 325a and hence the yoke 49. As shown in Figure 16, projecting to the left from the cross bar 49 at the top of the yoke thereof are two arms 524a and 525a. To the end of said arms is attached a frame 526a for holding the peeling mechanism. The ears 527a of the peeling mechanism are attached to the arms 524a and 525a. Between the left ends of two parallel bars 529a which form a part of the frame 526a is a bearing block 530a which serves as a journal for one end of a shaft 531a. The right end of the shaft 531a is journalled within a bearing block 532a. Bolts 533a provide an anchorage for the bearing blocks 530a and 532a to the frame member.

Extending downwardly from the left end of the frame 526a are legs 534a to which are attached apertured arms 536a by means of bolts 535a. The arms 536a, if desired, may be integral with the legs 534a instead of being fabricated thereto. Journalled within bearings 537a and 538a within the legs 534a and arms 536a, respectively, are short spindles 71 to which the ends of the peeling blade 76 are integrally attached through the agency of heads 75. Pinions 539b are feathered to a shaft 539a. A segmental gear 542a is fastened to the left end of the shaft 531a by means of a set screw to rotate therewith and to commonly mesh with the two pinions 539b. Figure 18 shows the contour taken by the peeling blade 76 and the exact manner in which it is attached to the head 75. In the present instance the contour of the blade is similar to the longitudinal surface element of a pear. Just to the left of the block 75, see Fig. 18 on each of the spindles 548a there will be noted a cam 552a, each of which cams embodies a sharp shoulder 553a and an arcuate section 554a followed by an inclination 555a and a long arcuate section 556a. The cams 552a are placed fixedly upon the spindles 548a in a selected angular relation with respect to the peeling blade 76.

On the right-hand end of shaft 64 is fastened a segmental gear 65, which gear engages both pinions 73 and 74. An arm 95 integral with the gear 65 extends upwardly to where it pivotally engages a clevis member 560a by means of a bolt 561a. The lever 95 is operated by a link 563a, see Fig. 10, so that the segmental gear is in operative connection with this lever and a vertical operating shaft 315a.

At the top of each of the frame members 61, Fig. 15, is secured a Z-shaped bracket 5740 which is held in place by means of bolts 5750. On top of each of the brackets is a threaded aperture 5760 for the reception of a thumb screw 5770 having upon its lower end a flanged boss 5780 and a lock nut 5790. Associated with each of the Z-brackets and its respective side frame member 5290 is a peeling pad mechanism shown in Fig. 15. Since each of these mechanisms is alike, the description will be directed particularly to the one shown in Fig. 15. Centrally located in the frame members 5290 is a vertical bearing 5800, which is perferably lined with a bushing 5810. Reciprocally held within the bushing 5810 is a sleeve 5820 having a channel 5830 extending upwardly from the bottom thereof to continue into a bearing 5840, the channel and bearing adjoining at a shoulder 5850. At the bottom of the sleeve 5820 is a head 5860 containing an inverted channel 5870. Preferably held within the channel 5870 by means of a pin 5880 is a head 5890 of a peeling pad 5900. On the top of the head 5890 are two angular faces 5910 and 5920 to form a dihedral, the two faces being adapted to abut against the ceiling of the groove 5870 to limit the movement of the peeling pad. Cotransgressing the peeling pad head 5890 and the peeling pad 5900 is an aperture 5930 which is in alinement with the channel 5830 in the sleeve 5820. The lower end of the aperture 5930 is countersunk at 5940 in the face of the peeling pad.

Extending through the opening 5830 and 5930 to be reciprocally contained within the bearing 5840 is a stem 5950 having on the lower end thereof a knockout pad 5960, which is of a thickness and diameter to set within the countersunk section 5940. At the upper end of the stem 5950 are placed collars 5970 and 5980 to limit the downward movement of the stem as it is urged by a compression spring 5990, the latter pressing against the shoulder 5850 and a block 6000 which is secured to the stem by means of a pin 6010.

About the sleeve 5820 at its top is a collar 6020 having a flat side 6030 for sliding against the side of the bracket 5740, see Fig. 14. A thumb screw 6040 is provided for holding the collar 6020 to the sleeve 5820. Between the collar 6020 and the flanged lug 5780 is a compression spring 6050 which constantly urges the sleeve 5820 downwardly to the limit provided by the collar 6020 abutting against the top of the bearing 5800. The knockout pad 5960 is always urged from the seat 5940 in the manner shown in Fig. 15. The spring 5990 is much weaker than the spring 6050, so that the knockout pad 5960 may be forced upwardly into the seat 5940 without first moving the peeling pad 5900 upwardly by compressing the spring 6050. Turning of the sleeve 5820 in the bearing 5800 is prevented by the flat face 6030 of the collar 6020 against the Z-bracket 5740.

*Mechanism for operating the hinged section of the fruit cup*

Secured to the bottoms of the brackets 66 by means of bolts 77 are brackets 78 in which there are threaded apertures 79, see Fig. 8. Bolts 80 are threaded into the apertures 79 from the back sides of the brackets 78 and have journalled onto shanks thereof sleeves 81. Projecting to the right from the sleeves 81 are fingers 82 with notches 83 formed within the lower extended part thereof.

Long curved fingers 84 are integral to the sleeves 81 and extend downwardly and to the left from the said sleeves. There are arms 85 extending upwardly from the sleeves 81, the arms being apertured at 86 to receive the threaded end of a bolt 87. Mounted upon the bolts 87 in a manner free to rotate are rollers 88. Rollers 88 are measurably positioned along the sleeves 81 so that they are in registry with the cams 74 upon the shafts 71.

Contraction springs 89 are anchored at an end to the cross member 50 by standard means 90. The lower end of the springs 89 carry a hook 91 for engaging the arms 82 by one of the notches 83. It is in this manner that the sleeves 81 are urged to turn in a counter-clockwise direction as limited by the rollers 88 coming in contact with the circular cams 74.

Arms 84 are positioned upon the sleeves 81 so that they extend downwardly in a vertical plane common to the rollers 92. Bolts 93, upon which the rollers 92 are free to revolve, secure said rollers to the lower extremity of the arms 94 projecting downwardly from the front side member 30 of the movable element of the fruit cups 24.

Normally the yoke 49 is in the upper position as shown in Fig. 1 and with the fingers 84 and the springs 84a raised or lifted above the rollers 92 of the fruit cups. The segmental gear 65 may be slightly further in the counter-clockwise direction than it is shown in Fig. 1. An arm 95 extending from the hub of the segmental gear 65 is connected to a linkage 563, Fig. 10, for the operation of said segmental gear. This linkage is of a flexible nature and will operate the segmental gear whether the yoke be at the upward limit of its movement or at the lower limit.

When a pair of fruit cups 24, each carrying a half fruit therein with its cut face uppermost, have been moved into position at station B, the mechanism for lowering the yoke 49 operates. As the yoke 49 is carried downwardly the springs 84a are carried against the left side of the rollers 92 to pivot the movable cup elements about the shaft 32. Thus the roller 92, with reference to Figs. 2, 3, 4 and 5, is caused to traverse a portion of the spring 84a and the finger 84 which is inclined upwardly to the right.

Springs 89 tend to hold the vertical portions of the fingers 84 against displacement to the left so that the roller 92 will be yieldingly urged to the right and consequently the cup wall segment 37 will be urged to the left as the element is pivoted about the journal in the shaft 32. When the yoke 49 has reached the limit of its downward movement, the springs 89 through the agency of the fingers 82 and 84 have closed the cup walls firmly about the fruit. The downward movement of the yoke 49 is so regulated that a peeling pad 96 will be pressed firmly upon the upwardly exposed flat surface of the fruit within the cup thereunder.

At this time the contour of the periphery of a cam 74 will be noted in detail. There is a short arcuate section 97 which is terminated upon one end by a sharp shoulder 98 and at the other end by an inclined section 99. A longer arcuate section 100 is opposed to the section 97 and is terminated at its two extremities by the shoulder 98 and the incline 99. The camming section 100 is of greater radius than the section 97. Both the cams 74 and the blades 76 are disposed for commonly rotating with the shafts 71.

When the peeling pad 96 lowers to contact with the upper exposed surface of the pear within the cup 24, the cam 74 is rotated to such a position that the roller 88 is adjacent to the shorter camming surface 97. Thus the full effect of the spring 89 may be brought into play for closing the fruit cup 24.

Fig. 3 shows the relative positions of the peeling pad 96, a cam 74, the peeling blade 76 and a fruit cup 24 after the pad 96 has been brought into position against the fruit and incident to the entrance of the blade 76 into the fruit cup 24. The blade 76 is of such a profile with respect to the rotating axis thereof that it will follow very closely to the inner surface of the cup walls as it is rotated about its axis within the shaft 71. The blade rotates in the direction indicated by the arrow "A" shown in Fig. 2 and the sharpened edge 76a of the blade passes just beneath the inner surface of the fruit skin so that the latter is severed from the meat of the fruit.

The moment the hinged cup is released from its closed position, it automatically falls by its own weight to open position. As the peeling knife moves downwardly through the fruit, and as it approaches the bottom part of the cup in its downward movement, the blunt angle of the peeling knife functions to slide the fruit over against the inner wall of the hinged section, which is now swung to a position such that the inner wall portion thereof is concentric with the opposite face of the stationary cup section.

While the blade 76 is being moved downwardly through the fruit adjacent to the wall to the left side of the fruit cup, it is important that the fruit be compressed tightly within the cup so that the blade will pass at a uniform distance from the fruit peel and it is also important that the fruit not be turned within the cup by the pressure of the blade. The walls 25 of the stationary cup form a true arc about the rotating axis of the blade 76.

It will be noted, however, in Fig. 3, that whenever the right or shiftable cup element is carried into position adjacent to the left cup element, the inner side of the walls of this movable cup do not form a truly arcuate path about the rotating axis of the blade 76. Therefore, it is necessary to remove the wall forming the right section of the cup to make way for the blade when it comes to traverse the peel next to that wall. Shortly before the blade 76 reaches the bottom of the cup, the inclined section 99 of the cam 74 reaches the roller 88 to displace said roller and thus rotate the sleeve 81 in a clockwise direction about its support in the bolts 80. In this manner, the finger 84 is removed from the roller 92 against the urge of the contraction spring as is shown in Fig. 4. When the cup walls 37 are in the spread position as permitted by the removal of the effect of the spring 89 by the cam 74, the inner surface of those walls forms a true arc about the rotating axis of the blade 76. Then when the blade 76 passes over the walls 37 it will pass at a uniform distance beneath the skin of the fruit. The camming surface 100 of the cam 74 is of such extent that the finger 84 is displaced from the roller 92 all the while that the blade 76 is traversing the wall 37 as will be seen in Fig. 5 where the blade is shown after it has emerged from the cup. Unseating of the fruit from the cup 24 while the blade 76 is being moved upwardly at the right side thereof is prevented by the peeling pad 96.

After the blades 76 have traversed the interior of the cups 24, the upward movement of the yoke is begun so as to lift the peeling mechanism from association with the cups. While the yoke is being moved upwardly, the springs 84a pass from in contact with the rollers 92 to entirely remove the effect of the springs 89, so that the movable elements of the cups may be free to fall to the right by the pressure of the blunt nose of the blade, thereby opening the cups and leaving the fruit to lie loose therein.

Adjustment for various thicknesses of peel is had by means of the screws 43 or 47 and adjustment of the pressure on the fruit according to whether the general run is firm or soft is had by means of the notches 83 within the fingers 82. When a slightly harder fruit is to be handled by the machine, the pressure of the shiftable fruit cup section 24 will necessarily need to be adjusted. Soft fruit necessarily takes less pressure than hard fruit. This is done by turning the bolts 43 or 47 so that they will be advanced downwardly so that contact will not be had with the head of the bolt 40 so soon when the movable element of the cup is rotated in a clockwise direction, or in a direction to spread the cup elements.

The peeling cups are designed to accommodate fruit with a size variance of one-fourth of an inch (¼″), that is, one size cup will take fruit from say two and one-half inches (2½″) in diameter to two and three-fourths inches (2¾″) and the next size will take fruit from two and three-fourths inches (2¾″) to three inches (3″), and so on. When using the three-inch cup, this cup normally opens to three inches (3″) when set to take a peeling three thirty-seconds of an inch (3/32″) in thickness. In the fruit that comes to this cup there will be any size from two and three-fourths inches (2¾″) to three inches (3″). When the fruit within this range is smaller than three inches (3″) the movable half of the cup must push the fruit over to the stationary half and hold it there as the peeling knife starts its downward cut. This is the function of the mechanism shown in Figs. 2, 3, 4 and 5. The foregoing is accomplished by shifting the hooks 91 of the springs 89 into different notches 83. More leverage through the fingers 82 is had by the springs 89 when the hooks 91 are placed within the outermost notch 83.

In explanation of the adjustments 83 and also the adjustments 43 and 47, they deal only with the thickness of the peeling. Suppose that on the same three-inch cut it would be necessary to cut a standard three thirty-seconds of an inch (3/32″) peeling and the fruit happened to be rough and irregular and, therefore, a great deal of peeling was left on; it would then become necessary to make adjustments to take off a thicker peeling, but the range of fruit size that would be peeled in this cup would remain the same. Under certain conditions exact concentricity between the knife and the cup varies slightly when it is found necessary to thicken the peeling, say, at one side and not at the bottom or the other side of the fruit. In actual practice it is found that once the knife enters and leaves properly, the only adjustment that must be made is the thickness of the peel at the bottom of the cup.

The path of swing of the knife is constant about a definite axis when in the peeling position. Adjustment of the inner cup wall with respect to the knife swing is accomplished from three different points: first, with respect to the side on the stationary half where the knife enters the fruit, adjustment is made by loosening the clamp bolts 20, Fig. 1, swinging the table until the desired distance is obtained, then reclamping the bolts; second, with respect to the bottom of the cup, adjustment is accomplished by raising or lowering the slide or yoke 49, there being stop screws 50′ and 51′ for accomplishing this adjustment, see Fig. 17; third, with respect to the hinged half of the cup, where the knife comes out, adjustment is accomplished by the screws 40, Fig. 1, which allow the cup to swing open a specific amount to give the proper distance between the inner wall of the cup and the knife at this point. With this arrangement the inner wall of the cup can be made concentric with the swing of the knife, or if the condition or the shape of the fruit is such that a deviation is necessary, a thicker peeling can be taken from the fruit at any one, two or three places as the case may be demand.

It will be appreciated that in the present apparatus as distinguished from certain of my prior constructions, the peeling mechanism is operated to move forwardly bodily toward the fruit cups instead of having the cups move bodily toward the peeling mechanism. The advantage to be gained in this construction is most important because in order to have the peeling blade most efficiently perform its task there must be a particularly close alinement of the peeling mechanism with the fruit holding cups. The slightest disalinement noticeably impairs the effectiveness of the manner in which the fruit is pared. When the peeling blade is not in proper registry with the fruit cup there is a tendency for the peel to become jammed between the blade and the walls of the cup, thereby causing the blade to enter a greater depth into the fruit. Furthermore, there is a tendency for the paring blade to become jammed when the material of the fruit collects therebetween and the wall of the fruit cup.

By providing means whereby the peeling mechanism is moved and not the cups, a more extensible bearing surface may be conveniently provided when reciprocably supporting the peeling mechanism since the yoke 49 may be provided with a bearing surface spread substantially over one entire side of the frame of the machine whereby insuring a construction in which an excessive amount of wear would have to occur in the machine before the bearing surfaces could be displaced to one another sufficiently to cause the peeling blade to become disalined relative to the cup and should such wear occur to the movable carriage for the peeling mechanism it is easily corrected by making a single adjustment.

By referring to Figs. 4 and 5 it will be seen by engaging the springs 89 with the notches near the ends of the arms 82 greater leverage is had so that the walls of the fruit holding cups are made to grip the fruit more firmly. In so doing, the fruit is brought into closer contact with the wall of the cup whereby the peeling knife can be made to pass at a uniform distance from the periphery of the fruit. By making the cups with the movable wall element closable upon a complemental wall element, the device is capable of handling fruit of different sizes.

The movable wall element is adjusted to the path of the peeling knife while in open position and by manipulating the member 31 as hereinafter explained. The maximum size of fruit accommodated by the device will be that which can readily be placed in the cups while they are in open position. When the larger fruit is being peeled there will be very little movement of the movable cup walls for the body of the fruit will resist the action of the springs. When peeling smaller fruit, the cup walls may approach their most compact relation at the beginning of the operation.

The edge of the fruit at which the knife first enters will be pressed against the stationary wall. Inasmuch as the wall is predeterminedly fixed with respect to the path of movement of the knife, the knife will pass through the body of the fruit at a selected distance from the fruit peel. As the knife approaches the bottom of the cup each arm and its spring is released from its complemental roller in the manner hereinbefore described so that the movable wall will be free to pivot and will fall to open position.

As the knives continue to advance the movable wall elements open the cups and clear the way for the knives for free passage alongside of the walls. The pressure of the peeling knife in its downward cut tends to force the fruit laterally against the now open movable cup section and the movable sections being thus shifted to a position concentric with the inner wall of the stationary cup, the fruit will be correspondingly and laterally shifted into close contact with the inner wall of the shifted position of the movable cup segment in which position the knife will travel in a predetermined path relative to and concentric with the inner wall of the movable cup section in its shifted position.

It will thus be seen that the device is capable of efficiently peeling a variety of sizes of fruit within definite limits and that due to the automatic relative movements of the cup sections the peeling knife will sever the peel from the fruit in an exact and predetermined manner. During the peeling operation it will be noted that the peeling pad 96 operates in a position somewhat as shown in Fig. 9, being resiliently pressed downwardly thereon by the yielding mounting of the pad. It will also be apparent that the peeling knife 76 sweeps through the inner wall sections of the cup exterior of the pad 96, passing through the space between the periphery of the pad 96 and the inner wall of the cup sections.

By the term "pad" as used in the specification and claims is meant that mechanism adapted to engage the cut face of the half fruit to accomplish the function of the element 96.

No claim is made in the present application to the specific construction of the peeling knife as an article of manufacture, since such invention forms the subject matter claimed in my Patent No. 2,123,187, issued July 12, 1938. The process of making the peeling knife is claimed in my Patent No. 2,060,802, issued November 17, 1936.

The subject matter of the pad per se and the knock-out mechanism illustrated particularly in Fig. 14 is claimed specifically in my pending application Serial No. 625,851, filed July 29, 1932, entitled Fruit treating apparatus, except in so far as said subject matter enters into combination with the new construction of the cup claimed in the present application and the blunt nose peeling knife.

One very important feature of the present invention is embodied in the grooves and ribs 146 and 147 formed in the cup elements 25 and 37. The fruit when placed in the cup rests upon the ribs 147 and when it is compressed by the cup walls the sections of the peel over the grooves are pressed a short distance thereinto. In this manner the pressure upon the fruit peel is concentrated in certain predetermined area.

When a fruit is placed within a cup with smooth walls, the pressure is distributed over a greater surface area. The pressure is such that the paring knife forms a wedge without opportunity for expansion of the fruit cup. With grooves in the cup walls there is opportunity for the material displaced by the knife to escape into the cup grooves thus aiding the passage of the knife to thereby assist in the peeling operation. With the pressure concentrated at well defined spaced sections of the peel, a clean slice by the blade is possible. Better friction between fruit peel and cup is also obtained.

During the peeling operation there is a tendency for the several peel to bunch ahead of the knife and thus impair the cutting operation by distorting the knife. Such compacting of the fruit tends to disturb the regular path which the knife would otherwise take in respect to the adjacent near periphery of the cup. Chattering of the knife also may be produced by leaving an uneven surface upon the peeled product. Any irregular parts in the mass of fruit material moving ahead of the knife tends to cause an irregular path of travel of the latter through the fruit. These objections are wholly obviated by the use of the ribbed or otherwise recessed cup as shown because there is ample room within the spaces between the ribs of the cup for the thin layer of separated fruit peel to be displaced radially of the axis of rotation of the blade so that there is no tendency for the severed layer to move with the knife and the tendency of peeled-off sections of the fruit to resist movement of the knife is reduced inasmuch as the grooves between the ribs provide areas upon the fruit which are free from pressure and into which the severed material may be deflected in part by the increased pressure produced by the knife over the support areas of fruit.

It is important that the interior of the cup be properly proportioned to fruit supporting surface upon the ribs and to space between the ribs so that there will be sufficient room for displacement of the removed peripheral layer whether the interior is divided up into a great number of relatively narrow fruit supporting surfaces spaced closely or whether the interior consists of relatively wide support areas separated by correspondingly wide grooves. In the drawings the fruit receptacle is shown as having grooves of slightly greater width than the area of support upon the ribs. The combined area of the grooves is preferably substantially equal to the fruit displaced by the peeling knife passing through the fruit.

The formation of ribs 147 shown is that preferred. Other formations, however, are conceivable. For instance, the grooves may be arranged slightly angular to the rotating path taken by the knife, or they may even be arranged at right angles to the position shown.

It will be noted that by providing the inner surfaces of the fruit cup with the peel relieving means, I permit the fruit peeling and a slight amount of the fruit meat sliced from the fruit therewith by the blade to escape from the front of the blade and thus prevent the blade from becoming jammed and prevent the peel from bunching in front of the blade so that a clean slice through the fruit is made. To accomplish this purpose it is preferable that the grooves extend all the way along the walls of the cup, that is, along the bottom as well as along the side walls and that they preferably be in parallelism to the sweep of the knife.

Unless there are spaced supporting areas for supporting the fruit while it is being peeled, there will be no space into which the fruit peel and the thin portion of the pulp of the fruit which is removed therewith can be displaced or squeezed to partially compensate for the bulk of the advancing knife. If the removed section of the fruit cannot escape to the sides of ribs there is a tendency for the peel and the thin layer of the pulp portion of the fruit to become compressed and accumulate ahead of the blade to move therewith. To have a compacted lump of fruit pulp and fruit peel moving ahead of the blade or creeping along with it may cause an irregular path for the knife about the treated body of pulp. It is possible for the blade to gather small sections of the fruit or peel to compress them between the blade and the wall of the cup and thereby cause the blade to chatter. Thus the operation of the peeling blade may be seriously impaired if no space is provided into which the separated portion of the fruit may escape in a direction away from the body of the fruit.

A fruit may be supported upon areas that take up no more than one-half of the periphery of the fruit, as shown. The number of ribs and grooves and their respective widths is not of so much importance, within certain limits, as the apportionment of the cup surface to ribs and grooves. That is, the fruit can be supported upon a plurality of narrow ribs spaced less distantly as well as upon broader grooves spaced at a greater distance. The grooves, however, should be of adequate width to permit of possible deflection of a part of the removed portion of the fruit thereinto.

No claim is made herein to the process of peeling, which includes the utilization of the grooved portions of the cup broadly referred to as relieving means since such process claims form the subject matter claimed in my application Serial No. 750,152, filed October 26, 1934, entitled Process of peeling. The apparatus claims corresponding to the process claims of said application Serial No. 750,152, are included in the present application.

The action of the relieved portions of the cup is such that as the knife cuts through, the thicker portion of the knife which follows the cutting edge forces the flesh and peeling which is on the outside of the knife, outwardly into the grooves or relieved portions thereby creating room for the free passage of the knife. The grooves also give the fruit a better chance to settle down in the cup, that is, any small bump or irregularity on the fruit has a chance to go into one of the grooves or reliefs, while, if the cups were smooth, a small bump would hold it up away from the surface of the cup thereby causing more skips in peeling.

The preferred form of reliefs comprises the grooves running parallel to the sweep of the knife as they produce better results and are easier and cheaper to machine. Grooves or reliefs running parallel with the axis of the knife or checkerboard grooves, while practicable, do not produce as good results because such reliefs retard the side movement of the fruit when being peeled and also they make scavenging of the peel from the cups difficult because the peeling tends to ball up as the scavenging blade passes into the cup to remove the peel. The peeling knife would not strike these grooves because this can be controlled by the distance that the knife is set away from the inner wall of the cup. A spiral groove with the axis of the spiral running parallel or substantially parallel with the axis of rotation of the peeling knife is a practicable type of cup relief.

The width of the raised ribs must be wide enough and spaced close enough so that, when the peeling knife is creating a downward pressure on the fruit plus the pressure from the peeling pad, soft fruit will have supporting surface sufficient to keep the ribs from gouging into the fruit. And this is even more true where the coring assembly, used in connection with the present disclosed type of machine, comes down on the fruit. Here the rib supporting surface must be great enough to sustain the fruit without gouging. In general, rounded ribs would cut down the supporting surface to a point where gouging would take place.

The present application is filed as a continuation in part of my pending application Serial No. 63,019, filed February 8, 1936, entitled Fruit treating device, which in turn is a continuation of my prior filed application Serial No. 627,549, filed August 5, 1932, and designated Fruit holding cup.

Having thus described my invention, what I claim as new and desire to secure by Letters Patent is:

1. In a fruit treating machine, a fruit holding cup comprising walls having relatively wide, shallow grooves upon the fruit contacting face thereof, and a fruit paring blade disposed for sweeping within said cup adjacent said walls, said grooves traversing said walls in a direction substantially parallel to the course of movement of said blade.

2. In a fruit treating device, a paring knife, a fruit holding cup having spaced apart peripheral sections extending in relief individually across the interior periphery thereof for supporting a fruit therein while said paring knife moves therethrough, said sections combinedly conforming to the surface of such fruit and the transverse dimensions of said sections being substantially equal to that of the spaces between said sections.

3. In combination, a fruit holding cup comprising peripheral segments, a knife traveling through said cup for peeling fruit therein, means for urging the segments toward one another into eccentricity with the path of said knife, and means operating in synchronism with the movement of said knife for relatively oppositely shifting said segments and establishing substantial concentricity between said segments and the path of said knife during the peeling operation of said knife.

4. In combination, a cup comprising a stationary member, a member movable relative thereto in one direction, a second member movable relative thereto in another direction and substantially normal to the direction of movement of the first member, a knife, means for moving said knife into and out of said cup, means for moving both of said relatively movable members toward said stationary member prior to said knife entering said cup, and means for changing the relative position of one of said relatively movable members when said knife has moved approximately half way through said cup.

5. A peeling device comprising a pad, quadrant members associated with said pad and normally providing a cup truly semicircular in cross section, a knife in juxtaposition thereto having a path of movement concentric of said cup, and means for changing the normal relation of said quadrant members from one of true semicircularity to one of eccentricity with the path of movement of said knife coincidentally with the entry of said knife into said cup and for thereafter restoring said quadrant members to true semicircularity and of normal concentricity with the path of said knife when said knife has passed approximately half way through said cup.

6. A peeling device comprising a pad, relatively movable members in juxtaposition thereto forming a cup normally semicircular in cross section to receive fruit to be held therein by said pad, a knife adapted to sweep through said cup in a truly half circular path, and power operated means for relatively moving said cup members toward each other to form a cup of less than semicircular cross section for more firmly gripping the fruit between said members before movement of said knife into said cup and during the initial movement of said knife through said cup.

7. A peeling device comprising a pad, relatively movable quadrant members in juxtaposition to said pad and operable normally to provide a cup truly semicircular in cross section, one of said members being stationary, a knife having a path of movement concentric of said cup in its normal position, and means for moving said movable member toward said fixed member for more firmly gripping fruit between said members prior to the entry of said knife into said cup and during the initial movement of said knife through said cup.

8. A peeling device comprising a pad, members in juxtaposition thereto and forming a cup normally semicircular in cross section to receive a half fruit to be held therein by said pad, one of said members being stationary and the other pivoted to the stationary member, a knife adapted to sweep through said cup in a truly arcuate path, and means for moving the pivoted member toward the stationary member for more firmly gripping fruit between said members prior to the movement of said knife into said cup and during the initial movement of the knife through said cup.

9. In a fruit treating machine, the combination of a peeling knife movable in an arcuate path, means for moving said knife, a cup for holding a fruit and comprising a stationary wall member and a movable wall member, each of said walls having a concave fruit engaging periphery of a contour similar to the path of said blade, the periphery of the stationary wall being concentric to a section of such path and the periphery of the movable wall section normally being concentric therewith but movable from such position of concentricity with another section of the path of said knife, such movement being toward the stationary wall section, means for moving said movable wall in synchronism with the movement of said knife to compress fruit in said cup against said stationary wall while the knife is passing through that portion of its path adjacent to the stationary wall, and means for causing said wall moving means to become inoperative while the knife is traversing that portion of its path that is adjacent to the movable wall.

10. A fruit peeling device comprising a pad to engage the plane surface of a half fruit, a knife turning on an axis substantially within the plane of said pad and adapted to move away from, across and toward said pad in a half circular path, a stationary quadrant cup member adjacent to one-half of said pad, a movable quadrant cup member adjacent to the other half of said pad, and means for moving said movable quadrant synchronously with the movement of said knife away from, across and toward said pad.

11. A fruit peeling device comprising a pad to engage the plane surface of a half fruit, a knife rotating through a cup in a fixed path and adapted to move away from, across and toward said pad in a half circular path, a stationary quadrant cup member adjacent to one-half of said pad, a movable quadrant cup member adjacent to the other half of said pad, and means for moving said movable quadrant toward said stationary quadrant member to more firmly grip fruit between said quadrant members and said pad when the direction of travel of the knife is away from said pad.

12. In combination, relatively movable cup segments, a pad, a knife rotatable through said cup in a fixed path, means for moving said pad into proximity with said segments, means for relatively moving said segments out of concentricity with one another before said knife enters said cup, means for rotating said knife into and out of said cup, and means for moving said segments relatively away from one another into concentricity one with the other and with the path of said knife before said knife has passed approximately half way through said cup.

13. A fruit cup for holding half pears during a peeling operation comprising articulated substantially elongated members forming a recess shaped to receive and conform to the curved contour of a half pear, said members being provided with spaced apart, registering relatively shallow grooves, all of said grooves lying transversely to the longitudinal axis of said members.

14. In a fruit treating machine, the combination of means forming a fruit holding means having fruit supporting walls, said walls having spaced apart portions thereof forming curved abutments for contactingly supporting the curved portions of the fruit during the peeling operation, fruit peeling means, means for moving the peeling means within said holding means and through the body of the fruit adjacent the peel, said wall portions sustaining the fruit during the peeling operation and the spaces between the spaced wall portions receiving therein portions of fruit and peelings during the peeling operation.

15. In a fruit peeling device the combination of means for confining a half fruit between relatively rigid surfaces, a peeling knife, means for passing the peeling knife through the body of the fruit adjacent the peel while so confined, and means for causing displacement of spaced portions of the severed peel and a portion of the fruit severed therewith relatively to other portions of the severed peel.

16. In a fruit peeling apparatus the combination of means forming a recessed holder for confining therein a half fruit to be peeled, said means providing supporting surfaces against which the curved fruit abuts during the peeling operation, a peeling knife, means for moving the peeling knife through the fruit adjacent the peel thereof to peel the same, and means causing movement of spaced portions of the peel and spaced portions of the fruit severed therewith in a direction outwardly of certain other portions of the peel.

17. In a fruit peeling device the combination of means forming a fruit holder having relatively movable opposed wall portions adapted substantially to fit the curved outer periphery of a fruit, a peeling knife adapted to move through an arcuate path adjacent the inner wall of said holder to sever the peel from the fruit while confined in the holder, means for causing relative movement between said opposed fruit holder walls to provide a path for said knife at a predetermined distance from said walls, including means for relatively moving said opposed wall portions toward each other during the inward movement of said peeling knife into said fruit while in said fruit holder and for moving said opposed wall portions relatively away from each other during the movement of the knife outwardly of the fruit.

18. An apparatus for peeling fruit comprising means for supporting a half fruit at spaced apart areas upon and substantially coextensive with its peel, means for severing a thin peripheral layer including the peel from such held fruit, said supporting means including relieved portions disposed between the spaced apart areas into which the severed peel is adapted to move during the peeling operation.

19. In a fruit peeling machine the combination of a peeling knife adapted to move in a predetermined path, a fruit holder having relatively movable sections each having arcuate internal walls adapted to receive and contactingly support the curved peripheral portion of a half fruit therebetween, means for moving said peeling knife through said fruit holder, means for moving said fruit holder sections relatively, and means for shiftably positioning the fruit relative to said sections and to the fixed path of travel of the peeling knife.

20. In a fruit treating device the combination of a support, a fruit holder mounted thereon and comprising a stationary and a movable section, each having internal walls conformed to support the curved surface of a half fruit and between which such half fruit is adapted to be held, cutting means adapted to be moved relatively to the fruit holder to position the cutting means to cut into the fruit while held in the fruit holder, means for moving said cutting means in a fixed path, fruit contacting means adapted to contact the cut face of the fruit during the operation of the cutting means, and means for causing successive relative shifting movement between the sections of the fruit holder while the fruit is held therebetween and to cause shifting of the fruit in and relative to the fruit holder in opposed directions to position it for the cutting operation.

21. In a machine for peeling half fruit, the combination of half fruit sustaining means comprising relatively shiftable sections the inner curved walls of which provide spaced apart portions upon which corresponding portions of the curved outer surfaces of the peel of the half fruit are adapted normally to abut, the wall portions of said sections between the spaced apart portions thereof being recessed, means adapted to contact and press the cut face of the fruit while the fruit is held between said sections, peeling means, and means for moving the peeling means through the fruit adjacent the peel while the half fruit is held between the sections and the pressing means, whereby to cause the peel and a portion of the severed body of the half fruit being displaced into said recessed portions during the peeling operation.

22. In a machine for peeling half fruit, the combination of half fruit sustaining means comprising relatively shiftable sections the inner curved walls of which provide spaced apart portions upon which corresponding portions of the curved outer surfaces of the peel of the half fruit are adapted normally to abut, the wall portions of said sections between the spaced apart portions thereof being recessed, means adapted to contact and press the cut face of the fruit while the fruit is held between said sections, peeling means, and means for moving the peeling means through the fruit adjacent the peel while the half fruit is held between the sections and the pressing means, whereby to permit the peel and a portion of the severed body of the half fruit being displaced into said recessed portions during the peeling operation, and means for moving the fruit holder sections relatively during the movement of the peeling means and while held between the sections and the pressing means, whereby to position the peel of the fruit relatively to the path of movement of the peeling means.

23. A fruit holding cup having its inner wall provided with spaced apart relieved portions forming spaced raised portions extending in parallelism from edge to edge at the mouth of the cup, said raised portions being flat and concave in transverse section to conform to the shape of the area of the surface of the fruit to be supported thereby.

24. An apparatus for peeling half fruit comprising in combination means for confining from movement outwardly of the half fruit alternately disposed zones only of the peel to be severed, a peeling blade, means for passing the peeling blade through the fruit adjacent the peel or severing the peel therefrom, and means causing those portions of the peel between the alternately confined portions to shift radially outwardly of the confined portions during the peeling operation.

25. Fruit peeling means comprising means for holding a half fruit having stationary and movable walls, each conformed internally to engage and support the curved surface of a half fruit, peeling means, means for moving the peeling means adjacent the inner face of said stationary wall and means for shifting the movable wall to position the half fruit against the stationary wall to be cut by movement of the peeling means.

26. A peeling device for half fruit including means for holding a half fruit providing opposed walls between which the curved surfaces of the half fruit are engaged and supported, and common means for shifting the half fruit laterally against one of said walls and for cutting through the flesh of the fruit while so positioned.

27. A device for treating half fruit including means for holding a half fruit, providing opposed walls between which the curved surfaces of the half fruit are engaged and supported, and cutting means for shifting the supported half fruit to cutting positions and for cutting the half fruit so positioned.

28. A device for treating half fruit including fruit holding means having a relatively movable walls adapted to engage and support the peel surface of a half fruit and to be disposed concentric to and adjacent the path of movement of a peeling knife, a peeling knife, means to move the knife arcuately through a predetermined path of movement, said knife having its inner face curved transversely of its length so that the radius of curvature passes through the axis of rotation of the knife and having a portion of its outer face converging at a rather blunt angle to the plane of the inner face of the knife whereby as said knife is moving inwardly through the fruit as it approaches its innermost limit of travel, it shifts the half fruit laterally.

29. In a device of the class described, the combination of fruit holding means having spaced walls between which the peel surface of a half fruit is supported, a peeling knife having a cutting edge and a fruit displacing portion and means for moving the knife through the holding means to cause the displacing portion to shift the half fruit laterally into peeling position and to cause the cutting edge to peel a portion of the half fruit so positioned.

30. In a device of the class described, the combination of a support, a drive shaft thereon, a turret rotatable with said shaft, a fruit holder on said turret having a section stationarily mounted on said turret and having a section movable relatively to said stationarily mounted section, said sections being constructed to receive and support therebetween the curved surface of a half fruit with its cut face uppermost, fruit cutting means, means relatively to position the cutting means into contact with the cut face of the half fruit and to cause the cutting means to cut through the flesh of the half fruit, and means angularly to adjust the turret relatively to the cutting means whereby adjustably and relatively to position the cutting means and inner wall of the stationary fruit holder.

31. In a device of the class described, the combination of an intermittently operable turret a fruit holder on said turret and adapted to move in a horizontal plane and having a stationary inner wall section adapted to contact the outer curved surface of a half fruit, a peeling head having an arcuately movable peeling knife shiftably mounted thereon, means for shifting the head toward the fruit holder to position the knife adjacent the stationary inner wall and for moving the knife across and adjacent the inner wall to peel the half fruit and means for adjusting the range of travel of the head to adjust the depth of cut of the knife.

32. In a device of the class described, the combination of a fruit holder having a stationary section, a section pivoted relatively thereto and adapted to move in reverse directions to eccentric and concentric positions relatively to the stationary section, a peeling knife, means arcuately to move said knife across the inner face of the stationary section and across the face of the movable section when the latter is shifted to concentric position and means for adjusting the movement of the movable section in a direction away from the stationary section so that it will be more or less concentric.

33. In a device of the class described, the combination of a support, a turret intermittently rotatable thereon, a plurality of spaced holders for holding a half fruit mounted on said turret, each comprising a stationary quarter of a holder and a quarter of a holder pivoted relatively thereto and adapted to hold a half fruit with its cut face uppermost, a peeling head shiftable toward and from the successive fruit holders, a peeling blade on the head and adapted to be positioned arcuately to move through each holder to peel the half fruit disposed therein, and means for adjustably positioning the blade relative to its position of entry into the half fruit, means for adjustably determining the depth of cut at the bottom of the half fruit and for adjustably determining the thickness of peel cut at the exit of the blade from the fruit holder.

34. In a device of the class described, the combination of a turret adapted intermittently to turn in a fixed horizontal plane, spaced cup supports or lugs thereon, a cup section rigidly mounted on each lug, a second cup section pivoted to said first cup section and having a depending leg carrying a friction roller and having a laterally extending arm, adjusting means engaging said arm and the turret, a peeling head mounted vertically to reciprocate to and from each cup when said cups are brought into position by movement of said turret, a peeling blade swingably mounted on said head, cam means moving in synchronism with said blade, lever means pivoted on said head and including a first arm cooperating with and shifted by said cam means, a second arm adapted to contact the friction roller of said second cup section, a third arm and spring means adjustably engaging said third arm.

35. In a device of the class described, the combination of a support, a fruit holder having inner wall portions engaging the curved surface of a half fruit for holding it with its cut face exposed, cutting means adapted to move through the flesh of the fruit beginning at the cut face of the half fruit, means for actuating the cutting means and means for adjusting the distance from the inner wall portion of the fruit entering position of the cutting means where the cutting means cuts into the cut face of the half fruit.

36. In a device of the class described, the combination of a support, a fruit holder having inner wall portions engaging the curved surface of a half fruit for holding it with its cut face exposed, cutting means adapted to move through the flesh of the fruit beginning at the cut face of the half fruit, means for actuating the cutting means and means for adjusting the depth of the cut taken by the cutting means relative to the bottom of the fruit holder.

37. In a device of the class described, the combination of a support, a fruit holder having inner wall portions engaging the curved surface of a half fruit for holding it with its cut face exposed, cutting means adapted to move through the flesh of the fruit beginning at the cut face of the half fruit, means for actuating the cutting means and means for adjusting the distance from the inner wall portion to the path of movement of the cutting means as the cutting means emerges from the flesh of the half fruit during the cutting action.

38. In combination, fruit holding means including a stationary section and a movable section, each having inner curved walls to support the curved surfaces of a half fruit with its cut face outermost, an additional relatively movable section adapted to contact the cut face of the half fruit while supported by said first mentioned sections, means relatively to shift all of said sections toward each other whereby to press against and firmly to hold the half fruit in predetermined position, means to form an arcuate cut through the flesh of the fruit while so held, means to move the first mentioned movable section toward the stationary section and then away from the stationary section while substantially maintaining the position of the additional section to shift the half fruit in said holding means to a position first into pressing engagement with the stationary section and then into pressing engagement with the movable section in its outwardly shifted position, and means to form an arcuate cut through the flesh of the fruit while the fruit is so held in its shifted position.

39. In a device of the class described, the combination of fruit holding means including a stationary section and a movable section having complemental concave fruit supporting walls to support the curved surfaces of a half fruit, means for resiliently shifting said movable section so that said walls are eccentric whereby to press the half fruit resiliently against the stationary wall, additional means adapted to press against the cut face of the half fruit while said first mentioned sections are in such eccentric position, peeling means adapted to cut arcuately through the flesh of the half fruit adjacent the inner stationary wall while the fruit is so held, means to cause the movable section to shift to substantially concentric position, and means for laterally shifting the half fruit relatively of said stationary section and across the additional pressing means to a second peeling position whereby to be peeled by the continued movement of the peeling means.

40. In a device of the class described, the combination of fruit holding means adapted to engage and support the curved surface of a half fruit, cutting means, means for actuating the cutting means for moving the same through the flesh of the half fruit to sever a portion therefrom, said cutting means serving to shift said half fruit laterally to position it relative to the path of movement of the cutting means.

41. In a device of the class described, the combination of fruit holding means adapted to hold a half fruit, cutting means, and means for shifting the cutting means into contact with the half fruit laterally to shift an uncut portion of the half fruit into position subsequently to be cut by said cutting means.

42. In a fruit treating machine, the combination of fruit holding means having relatively movable wall sections internally conformed contactingly to support therebetween the curved surface of a half fruit, cutting means arcuately movable through said fruit while so supported, means for moving one of said sections to position the half fruit against the wall of the opposite section, means thereafter to move said first mentioned section to a predetermined different position and to move the half fruit against the wall of said first mentioned section in its different location to reposition the fruit, and means operating in timed relation to the positioning of said half fruit for arcuately moving said cutting means through the flesh of the half fruit.

43. In a fruit treating machine, the combination of fruit holding means having relatively movable wall sections internally formed contactingly to support therebetween the curved surface of a half fruit, cutting means arcuately movable through said fruit while so supported, means for relatively moving said sections to a position in which their confronting fruit supporting walls are closer together than when concentrically disposed and with the fruit held therebetween, by which relative movement the half fruit is positioned against one of said walls, means for thereafter relatively moving said wall sections to a position in which they are substantially concentrically disposed, means for moving the half fruit against the wall opposite to the one against which the fruit was first positioned, and means operating in timed relation to the positioning of said half fruit for arcuately moving said cutting means through the flesh thereof.

44. In a fruit treating machine, the combination of fruit holding means having a stationary section and having a section movable toward and away from said stationary section, said sections having internal walls formed contactingly to support therebetween the curved surface of a half fruit, cutting means arcuately movable through said fruit while so supported, means for shifting the movable section toward said stationary section to position the half fruit firmly against the wall of the stationary section, means for thereafter causing said movable section to move away from the stationary section to a predetermined position with respect to said stationary section and for moving the half fruit laterally into firm contact with the wall of the movable section while in its new position, and means operable in timed relation to the positioning of the half fruit adjacent the supporting walls of the stationary and movable sections for arcuately moving said cutting means through the flesh of the half fruit.

45. In a fruit treating machine, the combination of fruit holding means having relatively movable wall sections internally formed contactingly to support therebetween the curved surface of a half fruit, cutting means arcuately movable through said fruit while so supported, means for arcuately moving said cutting means, and means operating in timed relation to the movement of the cutting means for causing relative movement between said wall sections to cause the half fruit properly to be positioned therebetween and relatively to each of said sections and for moving said cutting means in a predetermined path through the flesh of the half fruit.

46. In a fruit peeling device, the combination of a fruit holder having sections relatively movable toward and away from each other and each adapted to engage and support the peel surface of a half fruit therebetween, a peeling knife arcuately movable to pass through said holder to peel the fruit therein, and means operable in timed relation with the movement of the knife through the fruit holder and including the relative approaching and recessive movements of the fruit holding sections for alternately shifting the half fruit into contact with each one of said sections for positioning the fruit relative to the path of movement of the fruit peeling knife.

47. In a fruit treating device, a fruit cup having spaced apart wall segments relatively movable toward one another to grip the fruit therebetween, a fruit paring mechanism mounted for movement toward said fruit cup, and means carried by said paring mechanism for relatively moving said wall segments toward one another when the paring mechanism is adjacent the cup.

48. A fruit peeling means comprising a cup having a movable wall internally conformed contactingly to support the curved surface of a half fruit, a knife arcuately movable along a fixed path within said cup, and means for moving said wall from a position eccentric to the path of movement of said knife outwardly relatively to opposed wall portions of said cup to a position in a predetermined spaced relation and concentric to the path of movement of said knife.

49. In combination in a peeling device, fruit holding means including a stationary segment, a movable segment, said segments being internally conformed contactingly to support the curved surface of a half fruit, a knife movable past the internal peripheries of said segments, and means for moving said movable segment toward said stationary segment and into a position eccentric therewith, means for moving said knife into proximity with and substantially concentrically with said stationary segment, means causing the movement of said movable segment away from said stationary segment, and said knife moving means continuing the advance of said knife into proximity and concentricity with said movable segment.

50. A peeling device comprising an auxiliary fruit holding means adapted to engage the flat cut face of a half fruit, relatively shiftable members constructed normally to provide a cup whose inner walls are normally substantially concentrically disposed relatively to each other, a knife having a path of movement concentric of said fruit holding members when in their normal position, means for relatively moving said members toward each other so that the inner walls of said fruit holding members are eccentric and closer together than when said members are in normal and concentric position for positioning the fruit relatively to the wall of one of said members prior to the entry of said knife into said cup and during the initial movement of said knife through said cup and means thereafter for relatively moving said members apart.

51. In a fruit peeling machine the combination of a fruit holder having relatively movable sections, each internally conformed to engage and support the curved surface of a half fruit therebetween for peeling, a peeling knife adapted to move through said fruit holder to peel the fruit therein, means for moving said sections relatively toward one another to move the fruit in one direction to a first position relative to the path of movement of the knife, means subsequently causing relative shifting of the sections in an opposite direction to a predetermined position, and means synchronized with the movement of said knife and with the subsequent relative movement of the sections for causing the shifting of the fruit in an opposite direction and relatively to the fruit holder sections to reposition the fruit relative to the path of movement of the peeling knife.

52. A half pear holding cup for a fruit peeling device comprising articulated cup sections, each elongated and having its inner wall concave to provide a curved surface substantially to correspond with one half of the curved surface of a half pear, the inner wall of each cup section being formed with parallel grooves providing therebetween relatively unyielding fruit supporting surfaces, said surfaces being substantially flat and concaved and extending transversely of each section relative to the elongated axis of such cup section, said grooves each extending entirely from edge to edge of each section of the articulated cup sections registering with one another to form a continuous series of grooves in the cup.

53. In a device of the class described, the combination of fruit holding means including opposed fruit confining surfaces each conformed to engage and support the curved surfaces of a half fruit, means for maintaining an unpeeled fruit between such surfaces, a peeling knife movable relatively close to said surfaces during the peeling operation, means for moving the peeling knife to peel the fruit, and means operative during peeling for causing spaced apart areas of the severed peel to shift outwardly of the fruit supporting surfaces, the combined area of displacement of said outwardly shifting peel areas substantially equalling the cross sectional area of the fruit displaced by the peeling knife passing through the fruit.

54. An apparatus for peeling half fruit comprising fruit holding means including fruit supporting means for maintaining and confining spaced portions of the peel of the half fruit from shifting movement radially outwardly of the fruit, said confining means being substantially coextensive with the entire area of the peel to be severed, means for severing the peel from the fruit while so held, and means causing those portions of the severed peel disposed between the portions of confined peel to shift radially outwardly of the surface of the fruit.

55. Fruit peeling means comprising means for holding a half fruit having stationary and movable walls between which the curved surface of a half fruit is engaged and supported, peeling means, means arcuately to move the peeling means, means for causing movement of the movable wall away from the stationary wall, and means acting in timed relation with the movement of the peeling means for shifting the half fruit away from the stationary wall into peeling position against the movable wall to be cut by movement of the peeling means.

56. An article of manufacture comprising a stationary quarter of a cup for supporting a part of the half fruit and a quarter of a cup for supporting the remaining part of the half fruit and pivoted relative to the stationary quarter of a cup and shiftable toward and away from the stationary quarter of a cup, and means for adjusting the amount of inward and also outward movement of the pivoted quarter of a cup.

MARK EWALD.

CERTIFICATE OF CORRECTION.

Patent No. 2,255,049.   September 9, 1941.

MARK EWALD.

It is hereby certified that error appears in the printed specification of the above numbered patent requiring correction as follows: Page 3, second column, line 35, for "als" read --also--; page 4, second column, line 6, for "stem 25" read --stem 26--; line 49, for "frequency" read --frequently--; page 5, first column, line 67, for "on" read --or--; page 8, second column, line 3, for the word "cut" read --cup--; page 10, first column, line 19-20, for "bunchign" read --bunching--; page 13, second column, line 16, claim 33, for "holf" read --hold--; and that the said Letters Patent should be read with this correction therein that the same may conform to the record of the case in the Patent Office.

Signed and sealed this 11th day of November, A. D. 1941.

(Seal)

Henry Van Arsdale,
Acting Commissioner of Patents.